US012465244B2

(12) United States Patent
Wu et al.

(10) Patent No.: US 12,465,244 B2
(45) Date of Patent: Nov. 11, 2025

(54) EXTRACTING PARAMETERS FOR ANALYTE CONCENTRATION DETERMINATION

(71) Applicant: Ascensia Diabetes Care Holdings AG, Basel (CH)

(72) Inventors: Huan-Ping Wu, Granger, IN (US); Mark D. Cerutti, Everett, MA (US); Bern Harrison, Moscow, ID (US)

(73) Assignee: Ascensia Diabetes Care Holdings AG, Basel (CH)

( * ) Notice: Subject to any disclaimer, the term of this patent is extended or adjusted under 35 U.S.C. 154(b) by 7 days.

(21) Appl. No.: 17/394,209

(22) Filed: Aug. 4, 2021

(65) Prior Publication Data

US 2022/0039700 A1 Feb. 10, 2022

Related U.S. Application Data

(60) Provisional application No. 63/061,167, filed on Aug. 4, 2020, provisional application No. 63/061,152, filed
(Continued)

(51) Int. Cl.
*G16H 40/67* (2018.01)
*A61B 5/00* (2006.01)
(Continued)

(52) U.S. Cl.
CPC ........ *A61B 5/14532* (2013.01); *A61B 5/0002* (2013.01); *A61B 5/1451* (2013.01);
(Continued)

(58) Field of Classification Search
CPC . A61B 5/14532; A61B 5/0002; A61B 5/1451; A61B 5/1486; A61B 5/6801;
(Continued)

(56) References Cited

U.S. PATENT DOCUMENTS

2005/0161346 A1 7/2005 Simpson et al.
2005/0245799 A1* 11/2005 Brauker ............. A61B 5/14532
600/347
(Continued)

FOREIGN PATENT DOCUMENTS

CN 1975403 A 6/2007
CN 106805950 A 6/2017
(Continued)

OTHER PUBLICATIONS

U.S. Appl. No. 17/394,290, filed Aug. 4, 2021, Wu et al.
(Continued)

*Primary Examiner* — Alex M Valvis
*Assistant Examiner* — Grace L Rozanski
(74) *Attorney, Agent, or Firm* — Erise IP, P.A.

(57) ABSTRACT

A method of determining glucose values during continuous glucose monitoring (CGM) measurements includes providing a CGM device including a sensor, a memory, and a processor; applying a constant voltage potential to the sensor; measuring a primary current signal resulting from the constant voltage potential and storing the measured primary current signal in the memory; applying a probing potential modulation sequence to the sensor; measuring probing potential modulation current signals resulting from the probing potential modulation sequence and storing measured probing potential modulation current signals in the memory; determining an initial glucose concentration based on a conversion function and a ratio of measured probing potential modulation current signals; determining a connection function value based on the primary current signal and a plurality of the probing potential modulation current signals; and determining a final glucose concentration based on the initial glucose concentration and the connection function value. Other aspects are disclosed.

20 Claims, 13 Drawing Sheets

Related U.S. Application Data on Aug. 4, 2020, provisional application No. 63/061,157, filed on Aug. 4, 2020, provisional application No. 63/061,135, filed on Aug. 4, 2020.

(51) Int. Cl.

| | | |
|---|---|---|
| *A61B 5/145* | (2006.01) | |
| *A61B 5/1486* | (2006.01) | |
| *A61B 5/1495* | (2006.01) | |
| *G01N 33/487* | (2006.01) | |
| *G01N 33/49* | (2006.01) | |
| *G16H 40/40* | (2018.01) | |
| *G16H 50/30* | (2018.01) | |
| *G16H 50/70* | (2018.01) | |

(52) U.S. Cl.
CPC .......... *A61B 5/1486* (2013.01); *A61B 5/6801* (2013.01); *A61B 5/72* (2013.01); *A61B 5/7228* (2013.01); *G01N 33/48707* (2013.01); *G01N 33/49* (2013.01); *G16H 40/67* (2018.01); *A61B 5/14865* (2013.01); *A61B 5/1495* (2013.01); *A61B 2560/0223* (2013.01); *G16H 40/40* (2018.01); *G16H 50/30* (2018.01); *G16H 50/70* (2018.01)

(58) Field of Classification Search
CPC ..... A61B 5/72; A61B 5/7228; A61B 5/14865; A61B 5/1495; A61B 2560/0223; G16H 40/67; G16H 40/40; G16H 50/30; G16H 50/70; G01N 33/48707; G01N 33/49
See application file for complete search history.

(56) References Cited

U.S. PATENT DOCUMENTS

| | | | | |
|---|---|---|---|---|
| 2010/0270178 A1* | 10/2010 | Guo | .................... | A61B 5/1486 |
| | | | | 205/777.5 |
| 2013/0186755 A1* | 7/2013 | Chu | .................... | G01N 27/3272 |
| | | | | 204/403.14 |
| 2013/0245401 A1* | 9/2013 | Estes | .................. | A61B 5/14532 |
| | | | | 600/309 |
| 2016/0077037 A1* | 3/2016 | Cha | .................... | G01N 27/3274 |
| | | | | 205/777.5 |
| 2018/0306744 A1* | 10/2018 | Malecha | ............ | G01N 33/5438 |
| 2019/0125225 A1 | 5/2019 | Rebec et al. | | |
| 2019/0346399 A1 | 11/2019 | Wu | | |
| 2020/0029876 A1 | 1/2020 | Brister et al. | | |
| 2020/0205701 A1 | 7/2020 | Bohm et al. | | |
| 2020/0245910 A1* | 8/2020 | Mallas | .................. | A61B 5/686 |
| 2020/0245912 A1* | 8/2020 | Wu | ........................ | A61B 5/002 |

FOREIGN PATENT DOCUMENTS

| | | |
|---|---|---|
| JP | 2007108171 A | 4/2007 |
| JP | 2014516658 A | 7/2014 |
| WO | WO2018104835 A1 | 6/2018 |
| WO | WO2020161099 A1 | 8/2020 |

OTHER PUBLICATIONS

U.S. Appl. No. 17/394,279, filed Aug. 4, 2021, Wu et al.
U.S. Appl. No. 17/394,191, filed Aug. 4, 2021, Wu.
International Search Report & Written Opinion of International Application No. PCT/EP2021/071743 mailed Dec. 1, 2021.
Chinese Patent Application 202180059499.1, Office Action, issued Apr. 30, 2025.
Taiwan Patent Application 110128726, Official Action, issued Sep. 5, 2024.
Japanese Patent Application 2023-507263, Decision to Grant, issued Jul. 22, 2025.

\* cited by examiner

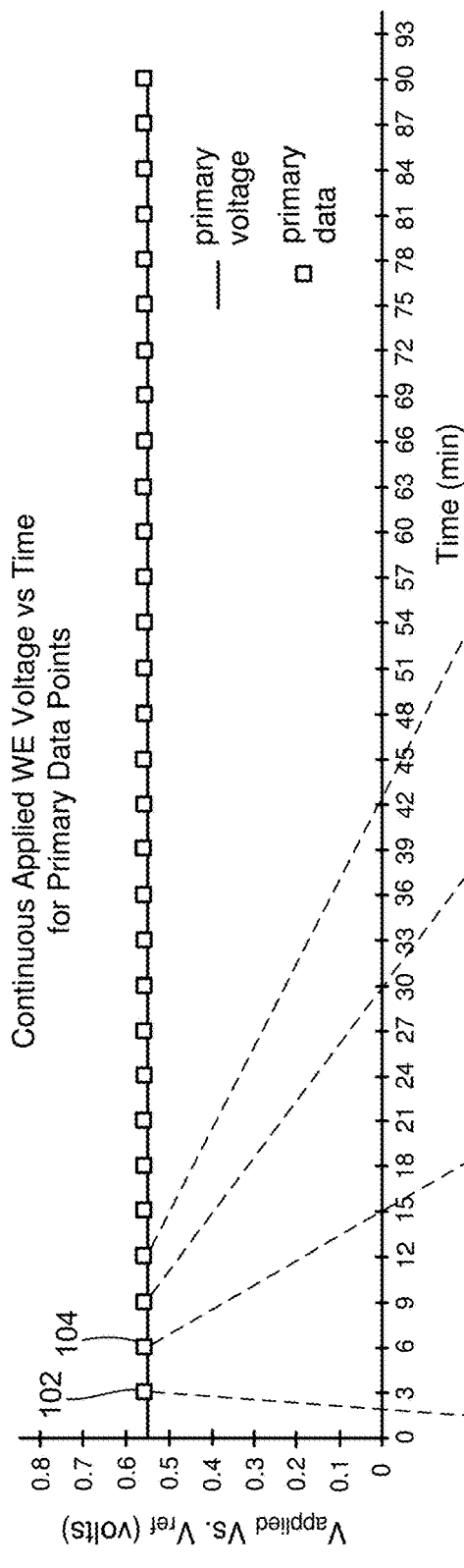
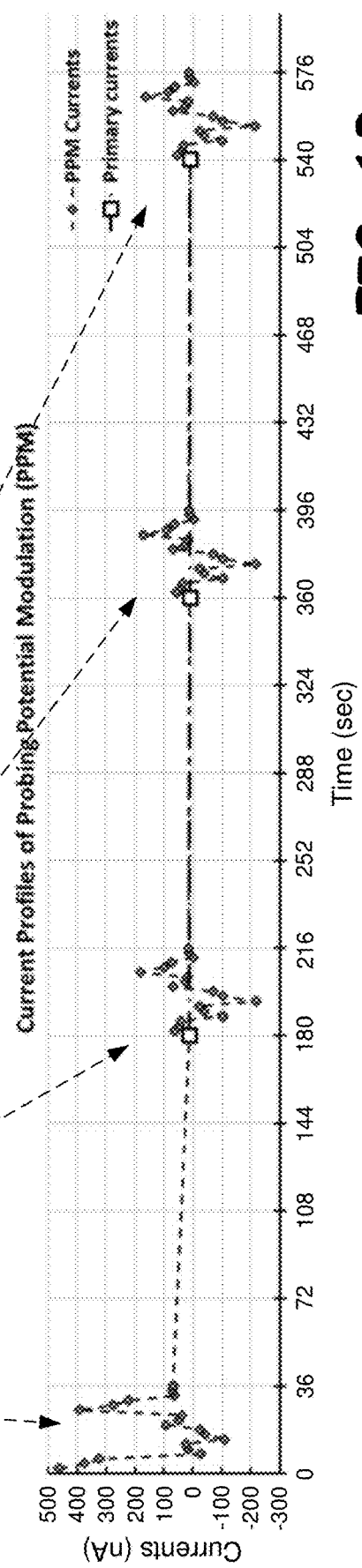
FIG. 1A
FIG. 1B

| Indicators | | $G_{raw}$ | | $G_{comp}$ | | | | | |
|---|---|---|---|---|---|---|---|---|---|
| | | %-bias | %-MARD | %-bias | %-MARD | ±10% | ±12.5% | ±15% | ±20% |
| i10 (lw-lb) | Mean | -10.67 | 20.17 | 0.12 | 3.75 | 94.6 | 97.3 | 98.5 | 99.8 |
| | SD | 21.11 | | 5.05 | | | | | |
| R4 | Mean | 3.43 | 27.80 | 0.19 | 3.99 | 92.6 | 96.4 | 97.9 | 99.3 |
| | SD | 33.63 | | 5.57 | | | | | |
| y45 | Mean | 3.73 | 28.43 | -0.25 | 4.14 | 91.8 | 95.0 | 96.9 | 98.8 |
| | SD | 33.80 | | 5.91 | | | | | |
| R1 | Mean | 1.96 | 19.47 | 0.26 | 3.93 | 93.1 | 96.2 | 97.7 | 99.5 |
| | SD | 25.86 | | 5.69 | | | | | |

FIG. 8

EXTRACTING PARAMETERS FOR ANALYTE CONCENTRATION DETERMINATION

CROSS REFERENCE TO RELATED APPLICATION

This claims the benefit of U.S. Provisional Patent Application No. 63/061,135, filed Aug. 4, 2020 and titled "CONTINUOUS ANALYTE MONITORING SENSOR CALIBRATION AND MEASUREMENTS BY A CONNECTION FUNCTION," U.S. Provisional Patent Application No. 63/061,152, filed Aug. 4, 2020 and titled "NON-STEADY-STATE DETERMINATION OF ANALYTE CONCENTRATION FOR CONTINUOUS GLUCOSE MONITORING BY POTENTIAL MODULATION," U.S. Provisional Patent Application No. 63/061,157, filed Aug. 4, 2020 and titled "EXTRACTING PARAMETERS FOR ANALYTE CONCENTRATION DETERMINATION," and U.S. Provisional Patent Application No. 63/061,167, filed Aug. 4, 2020 and titled "BIOSENSOR WITH MEMBRANE STRUCTURE FOR STEADY-STATE AND NON-STEADY-STATE CONDITIONS FOR DETERMINING ANALYTE CONCENTRATIONS," each disclosure of which is hereby incorporated by reference herein in its entirety for all purposes.

FIELD

The invention relates generally to continuous sensor monitoring of an analyte in a bodily fluid and, more particularly, to continuous glucose monitoring (CGM).

BACKGROUND

Continuous analyte sensing in an in-vivo or in-vitro sample, such as, e.g., CGM, has become a routine sensing operation in the field of medical devices, and more specifically, in diabetes care. For biosensors that measure analytes in a whole blood sample with discrete sensing, such as, e.g., pricking a finger to obtain a blood sample, the sample's temperature and hematocrit of the blood sample may be major sources of error. However, for sensors deployed in a non-whole blood environment with relatively constant temperatures, such as sensors used in a continuous in-vivo sensing operation, other sensor error sources may exist.

Accordingly, improved apparatus and methods for determining glucose values with CGM sensors are desired.

SUMMARY

In some embodiments, a method of determining glucose values during continuous glucose monitoring (CGM) measurements includes providing a CGM device including a sensor, a memory, and a processor; applying a constant voltage potential to the sensor; measuring a primary current signal resulting from the constant voltage potential and storing the measured primary current signal in the memory; applying a probing potential modulation sequence to the sensor; measuring probing potential modulation current signals resulting from the probing potential modulation sequence and storing measured probing potential modulation current signals in the memory; determining an initial glucose concentration based on a conversion function and a ratio of measured probing potential modulation current signals; determining a connection function value based on the primary current signal and a plurality of the probing potential modulation current signals; and determining a final glucose concentration based on the initial glucose concentration and the connection function value.

In some embodiments, a continuous glucose monitoring (CGM) device includes a wearable portion having a sensor configured to produce current signals from interstitial fluid; a processor; a memory coupled to the processor; and transmitter circuitry coupled to the processor. The memory includes a connection function based on primary current signals generated by application of a constant voltage potential applied to a reference sensor, and a plurality of probing potential modulation current signals generated by application of a probing potential modulation sequence applied between primary current signal measurements. The memory also includes computer program code stored therein that, when executed by the processor, causes the CGM device to measure and store a primary current signal using the sensor and memory of the wearable portion; measure and store a plurality of probing potential modulation current signals associated with the primary current signal; determine an initial glucose concentration based on a conversion function and a ratio of measured probing potential modulation current signals; determine a connection function value based on the primary current signal and a plurality of the probing potential modulation current signals; and determine a final glucose concentration based on the initial glucose concentration and the connection function value.

Still other aspects, features, and advantages of this disclosure may be readily apparent from the following detailed description and illustration of a number of example embodiments and implementations, including the best mode contemplated for carrying out the invention. This disclosure may also be capable of other and different embodiments, and its several details may be modified in various respects, all without departing from the scope of the invention. For example, although the description below is related to continuous glucose monitoring, the devices, systems, and methods described below may be readily adapted to monitoring other analytes, such as, e.g., cholesterol, lactate, uric acid, alcohol, or the like, in other continuous analyte monitoring systems.

BRIEF DESCRIPTION OF DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the invention in any way.

FIG. 1A illustrates a graph of applied voltage $E_0$ for a continuous glucose monitoring (CGM) sensor versus time according to one or more embodiments of the disclosure.

FIG. 1B illustrates a graph of current profiles of a probing potential modulation (PPM) sequence for the CGM sensor of FIG. 1A according to one or more embodiments of the disclosure.

FIG. 7A illustrates a graph of $G_{Ref}$ vs. R1 ratios; FIG. 7B illustrates a graph of $G_{Ref}$ vs. R4 ratios; FIG. 7C illustrates a graph of $G_{Ref}$ vs. y45 ratios; and FIG. 7D illustrates a graph of i10 vs. $G_{Ref}$ according to one or more embodiments of the disclosure.

FIG. 8 illustrates a table summarizing $G_{raw}$ and $G_{comp}$ from i10, R4, y45, and R1 with an in-vitro data set according to one or more embodiments of the disclosure.

DETAILED DESCRIPTION

Figure 2:
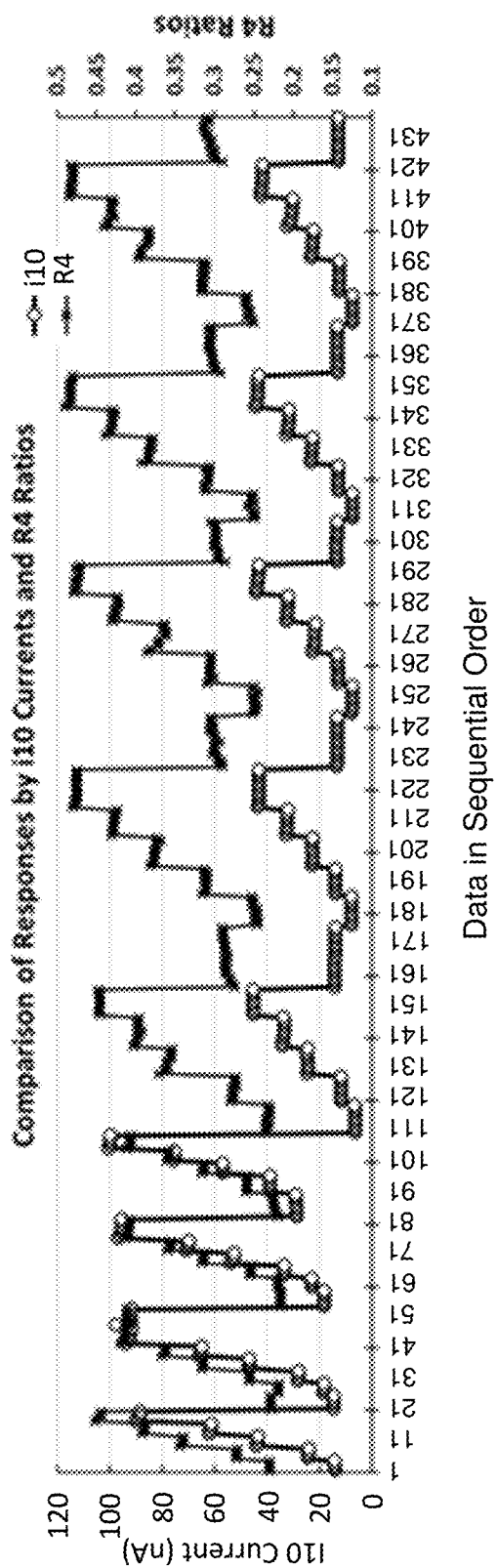
FIG. 2 illustrates a graph of a comparison of glucose response signals by the primary current i10 and the ratio parameters R4 of data in sequential order according to one or more embodiments of the disclosure.

Embodiments described herein include systems and methods for applying probing potential modulations (PPMs) on top of the otherwise constant voltage applied to an analyte sensor. The terms "voltage," "potential," and "voltage potential" are used herein interchangeably. "Currents," "signals," and "current signals" are also used herein interchangeably, as are "continuous analyte monitoring" and "continuous analyte sensing." As used herein, PPMs refer to intentional changes made periodically to the otherwise constant voltage potential applied to a sensor during continuous analyte sensing, such as application of probing potential steps, pulses, or other potential modulations to the sensor. Use of PPMs during continuous analyte sensing may be referred to as a PP or PPM method, whereas performing continuous analyte sensing without PPMs may be referred to as a NP or NPPM method.

Primary data points or primary currents refer to measurements of current signals generated in response to an analyte at a constant voltage potential applied to a sensor during continuous analyte sensing. For example, FIG. 1A illustrates a graph of applied voltage $E_0$ for a continuous glucose monitoring (CGM) sensor versus time according to one or more embodiments of the disclosure. Example times at which measurements of primary data points may be made, and subsequent PPMs may be applied, are shown. As shown in FIG. 1A, the constant voltage potential $E_0$ applied to the working electrode of an analyte sensor may be about 0.55 volts in this example. Other voltage potentials may be used. FIG. 1A shows an example of a typical cycle of the primary data points taken at a constant applied voltage. Primary data points are the data points measured or sampled at a constant applied voltage and at regular intervals, such as 3-15 minutes, during continuous glucose monitoring and are used to compute glucose values for a user. Primary data points may be working electrode currents measured for an analyte sensor during continuous analyte monitoring, for example. FIG. 1A does not show primary data points, but the time and voltage at which each primary data point is measured. For example, circle 102 in FIG. 1A represents the time/voltage (3 minutes/0.55 volts) at which a first primary data point (e.g., a first working electrode current) is measured for a sensor biased at a voltage of $E_0$. Likewise, circle 104 in FIG. 1A represents the time/voltage (6 minutes/0.55 volts) at which a second primary data point (e.g., second working electrode current) is measured for a sensor biased at a voltage of $E_0$.

PPM currents refer to measurements of current signals generated in response to PPMs applied to the sensor during continuous analyte sensing. PPMs are described in more detail below in connection with FIG. 3B, which shows an example PPM cycle that includes six steps in voltage potential, and FIG. 3E which shows example current responses to the PPM cycle of FIG. 3B. Currents generated during a PPM cycle, referred to as PPM currents, may be sampled and labeled as described in FIG. 3E (e.g., i11 is the first current sampled during the first voltage step, i12 is the second current sampled during the first voltage step, i13 is the third current sampled during the first voltage step, i21 is the first current sampled during the second voltage step, etc.). Other numbers and/or types of voltage potential steps may be used.

Reference sensors refer to sensors used to generate primary data points and PPM currents in response to reference glucose concentrations represented by blood glucose meter (BGM) readings, for example (e.g., primary currents and PPM currents measured for the purpose of determining prediction equations, including connection functions, that are subsequently stored in a continuous analyte monitoring (CAM) device and used during continuous analyte sensing to determine analyte concentrations).

For sensors deployed in a non-whole blood environment with relatively constant temperatures, such as sensors used in a continuous in-vivo sensing operation, sensor error may be related to the sensor's short and long-term sensitivity and method of calibration thereafter. There are several problems/issues associated with such a continuous sensing operation: (1) the long break-in (warmup) time, (2) the factory or in-situ calibration, and (3) the change in sensitivity during the continuous sensing operation. These issues/problems are seemingly related to the sensor sensitivity as expressed in the initial decay (break-in/warmup time), the change in sensitivity due to the susceptibility of the sensor to the environment while in sensor production, and the environments/conditions in which the sensor is thereafter deployed.

According to one or more embodiments of the disclosure, apparatus and methods are operative to probe an initial starting condition of a continuous sensor operation for a sample analyte and to probe the sensor condition at any point thereafter during the sensor's continuous sensing operation.

Methods are provided of formulating parameters for a prediction equation (e.g., a conversion and/or connection function) that may be employed to accurately determine analyte concentrations continuously from an analyte sensor. Furthermore, a method of and apparatus for determining analyte concentrations are provided with the use of PPM self-sufficient signals (e.g., working electrode currents resulting from the application of PPMs). Such methods and apparatus may allow analyte concentration determinations while (1) overcoming the effects of different background interfering signals, (2) levelling or removing the effects of different sensor sensitivities, (3) shortening the warmup time at the beginning of a (long-term) continuous monitoring process, and/or (4) correcting sensor sensitivity changes over the continuous monitoring process. These and other embodiments are described below with reference to FIGS. 1A-10.

For a continuous glucose monitoring (CGM) biosensor, which is usually operated with a constant applied voltage, the currents from the mediator are measured continuously as a result of the enzyme oxidation of the target analyte glucose. In practice, currents are typically measured or sensed every 3 to 15 minutes or at another regular interval despite being referred to as continuous. There is an initial break-in time when the CGM sensor is first inserted/implanted into a user, which may last from 30 minutes to several hours. Once the CGM sensor is broken-in, its sensitivity may still change for various reasons. Thus, there is a need to sense the sensor's operating condition during its initial and after break-in times to identify any changes in its sensitivity.

The CGM sensor operation starts with the applied voltage $E_0$ after it is inserted/implanted subcutaneously into a user. The applied voltage $E_0$ is usually at a point on the redox plateau of the mediator. For the natural mediator of oxygen with the enzyme of glucose oxidase, the oxidation plateau of hydrogen peroxide $H_2O_2$ (the oxidation product of the enzyme reaction) ranges from about 0.5 to 0.8 volts versus an Ag/AgCl reference electrode in a media of about 100-150 mM chloride concentration. The operation potential for the glucose sensor may be set at 0.55-0.7 volts, which is within the plateau region.

Embodiments described herein employ PPMs as periodic perturbations to the otherwise constant voltage potential applied to the working electrode of a subcutaneous biosensor in a continuous sensing operation (e.g., for monitoring a biological sample analyte such as glucose). During a continuous sensing operation, such as continuous glucose monitoring, sensor working electrode current is typically sampled every 3-15 minutes (or at some other frequency) for glucose value determinations. These current measurements represent the primary currents and/or primary data points used for analyte determinations during continuous sensing operation. In some embodiments, periodic cycles of probing potential modulations (PPMs) may be employed after each primary current measurement so that a group of self-sufficient currents accompanies each primary data point with information about the sensor/electrode status and/or condition.

Figure 3A:
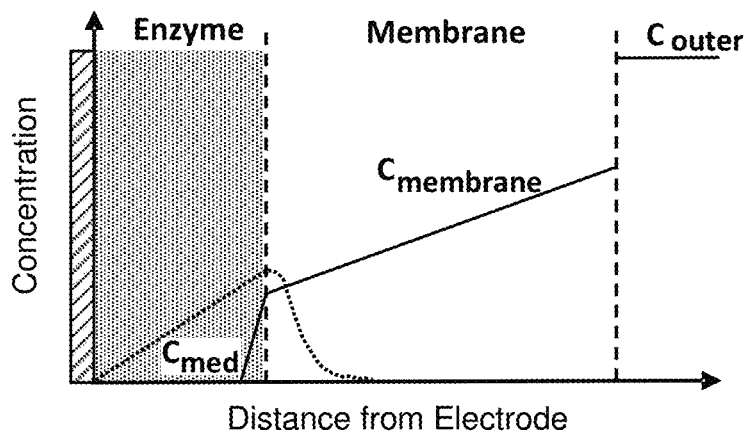
FIG. 3A illustrates a graph of a steady-state condition attended at the electrode and its nearby boundary environment according to one or more embodiments of the disclosure.
Figure 3B:
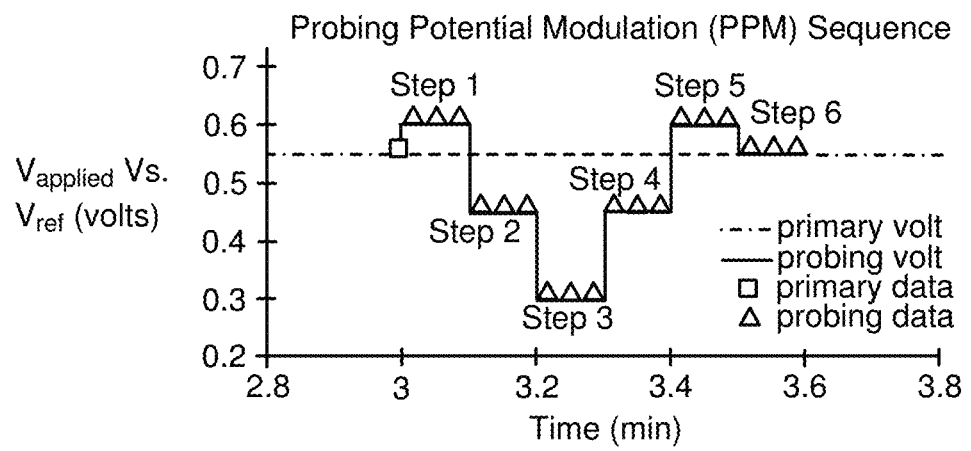
FIG. 3B illustrates a graph of an example of a PPM sequence applied to sensors with which data were collected according to one or more embodiments of the disclosure.

PPMs may include one or more steps in potential that are different than the constant voltage potential normally used during continuous analyte monitoring. For example, PPMs may include a first potential step above or below the constant voltage potential, a first potential step above or below the constant voltage potential and then a potential step returning to the constant voltage potential, a series of potential steps above and/or below the constant voltage potential, voltage steps, voltage pulses, pulses of the same or different durations, square waves, sine waves, triangular waves, or any other potential modulations. An example of a PPM sequence is shown in FIG. 3B.

As described, conventional biosensors used in continuous analyte sensing are operated by applying a constant potential to the working electrode (WE) of the sensor. Under this condition, the currents from the WE are recorded periodically (e.g., every 3-15 minutes or at some other time interval). In this way, biosensors generate currents that are only attributable to changes in analyte concentrations, not changes in applied potential. That is, non-steady-state currents associated with the application of different potentials are not present. While this approach simplifies the continuous sensing operation, the current signals in the data stream from application of a constant potential to the sensor provide minimum information about the sensor status/condition. That is, sensor current signals from application of a constant potential to a sensor provide little information relevant to issues associated with long-term continuous monitoring by the sensor, such as lot-to-lot sensitivity variations, the long warmup time due to initial signal decay, sensor sensitivity changes over a long-term monitoring process, effects from varying background interfering signals, or the like.

Continuous glucose monitoring (CGM) sensors implanted subcutaneously require timely calibrations against a reference glucose value. Conventionally, the calibration process involves taking a blood glucose meter (BGM) reading from a finger stick glucose measurement, or the capillary glucose value and entering the BGM value into the CGM device to set the CGM sensor's calibration point for the next operation period. Usually, this calibration process takes place on a daily basis, or at least one finger stick glucose measurement per day as the CGM sensor's sensitivity may change from day to day. This is an inconvenient but necessary step to ensure the accuracy of the CGM sensor system.

Embodiments described herein include systems and methods for applying PPMs on top of the otherwise constant voltage applied to an analyte sensor. Methods are provided for formulating parameters for a prediction equation, such as a conversion function and/or a correction function, that may be employed to accurately determine analyte concentrations continuously from an analyte sensor.

Extracted parameters: According to one or more embodiments of the disclosure, apparatus and methods are operative to determine analyte concentrations using extracted parameters, such as ratios R1, R4, and y45, described below, from currents under a non-steady-state (NSS) condition and steady-state (SS) degenerates. The use of the extracted parameters for determining analyte concentration represents a different and unique method for determining analyte concentrations. The analyte indicating parameters are extracted from currents of non-steady-state and steady-state degenerates during a continuous sensor operation between the repeated alternation of steady-state and non-steady-state conditions. Use of ratio parameters as the analyte indicating parameters has the advantages of being independent of the electrode size of the sensor, having a short warmup time, and being relatively free of the background signals. In addition, the ratio parameters can also provide a broad scope connection from in-vitro to in-vivo analyte to provide a narrow band of output analyte concentrations from a wide range of sensor responses through use of a connection function.

The PPM method described above provides potential modulation to the otherwise constant applied voltage. The primary data points obtained from the steady-state condition are used as an indicator of the analyte concentration while the associated PPM currents and PPM parameters are used for providing information about the sensor and electrode conditions. Examples of the PPM sequences and the output current profiles have a potential step from high to low before reversing back to high and thus the alternation of steady-state and non-steady-state conditions.

In some embodiments, extracted parameters, or more specifically ratio parameters, are used as input parameters in regression for error compensation. Some extracted parameters from currents of non-steady-state and steady-state degenerates, such as R1 (=i13/i11), R4 (=i43/i41) and y45 (=i43/i51), described below, correlate strongly with analyte concentrations. Being extracted parameters, such as ratios of the PPM currents, these parameters are unitless. FIG. 2 shows a line plot for one ratio parameter R4 in comparison to the primary current i10 in a series of linearity tests. It can be seen that there are distinct responses corresponding to the glucose concentration levels. To better understand the properties of these ratio parameters, the sensor membrane and electrode boundary conditions are described below.

Steady-state condition: Conventional biosensors used in continuous analyte monitoring are operated under a steady-state condition which is established when a continuous monitoring sensor is stabilized after a settling time with a constant applied potential to the working electrode (WE). Under this condition, the currents are drawn from a constant flow of incoming analyte molecules in a steady-state diffusion condition, created by an outer membrane. This condition is depicted in FIG. 3A. Under this condition, the boundary structure as defined by the enzyme layer, and the outer membrane, in theory creates a boundary environment to draw a constant flux of measurable species, or the reduced mediator, approximately defined by the straight line $C_{med}$. When there is no change in the analyte concentration $C_{outer}$, the current is proportional to the concentration gradient of the measurable species $C_{med}$ at the electrode surface, which is further dependent on the analyte concentration gradient as defined by the boundary condition.

The boundary environment: The boundary condition in FIG. 3A may be interpreted in theory as follows: The analyte concentration $C_{outer}$ is at some value which is in equilibrium with the membrane concentration $C_{membrane}$ at the outer interface of the membrane. The lower concentration of $C_{membrane}$ inside the membrane indicates that the membrane is designed to reduce the influx of the analyte molecules so that the biosensor operates at a steady-state condition. The relationship between $C_{outer}$ and $C_{membrane}$ is approximately governed by an equilibrium constant $K_{outer}=C_{membrane}/C_{outer}<1$. It is further governed by a lower diffusion coefficient $D_{membrane}$ than $D_{outer}$. Together the membrane permeability for the analyte $P_{membrane}=D_{membrane}*C_{membrane}$ defines the throughput of the analyte. As the analyte molecules move toward the electrode covered with enzyme, they are quickly attenuated to zero by the enzyme. Meanwhile the enzyme converts the analyte molecules into the measurable species oxidizable at the electrode, such as $H_2O_2$ with the oxygen as the mediator with respect to the glucose oxidase enzyme. The measurable species will diffuse toward the electrode as well as toward the membrane once generated. Under the constant applied voltage of fully oxidizing the measurable species, there will be a constant flux of the measurable species drawn toward the electrode. Soon, a steady-state is established where the current is proportional to the concentration gradient of the measurable species ($dC_{med}/dx$) at the electrode surface. Under the diffusion limited condition (meaning that the oxidization/consumption rate of the measurable species is at a maximum, limited only by the diffusion of the measurable species), the $C_{med}$ concentration gradient is projected to be a straight line, defined at the electrode surface as being zero and to a point at the membrane interface which is defined by the equilibrium condition reached by multiple processes (e.g., the analyte flux entering the enzyme, the consumption and conversion of the analyte by the enzyme and the diffusion of the measurable species). The concentration $C_{med}$ into the membrane is loosely defined by diffusion. This steady-state condition dynamically changes as the outer analyte concentration changes.

In the operation condition governed by probing potential modulation (PPM) cycles, the primary data points are in fact sampled and recorded under the steady-state condition because the boundary environment resumes to the steady-state condition after each non-steady-state potential modulation cycle, as depicted in FIG. 3B (which illustrates a PPM sequence or cycle having six steps, although fewer, more or different potential modulations steps may be employed).

Figure 3C:
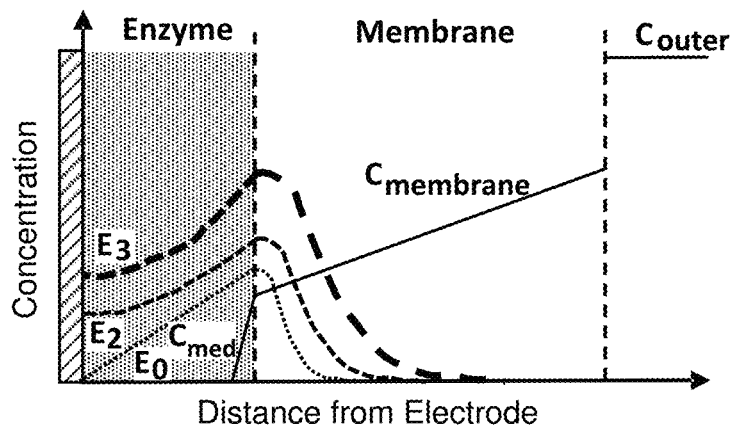
FIG. 3C illustrates a graph of a non-steady-state condition attended at the electrode and its nearby boundary environment during E2 and E3 potential steps according to one or more embodiments of the disclosure.

Potential modulation and non-steady-state condition: If the applied potential is modulated away from the constant voltage, such as a potential step from 0.55 V to 0.6 V (Step 1 in FIG. 3B and $E_0$ to $E_1$ in FIG. 3D) but still within the mediator's oxidation plateau (diffusion limited region in the V-axis), there will be some finite current generated with a small decay. This is still a faradaic process due to the asymmetrical plateau governed by $\exp(E_{app}-E^{O'})$, where $E_{app}$ is the applied voltage and $E^{O'}$ is the redox species formal potential representing its electrochemical property. This finite current with a small decay may be referred to as the plateau-degenerate, meaning a slightly different oxidation state on the plateau. The current-to-voltage relationship of the mediator is approximately described in FIG. 3D. An example of such output current is shown in FIG. 3E, with the PPM currents labelled i11, i12, and i13, while i10 is the primary current under a steady-state condition. For example, i11 is the first current sampled during the first potential step.

Figure 3D:
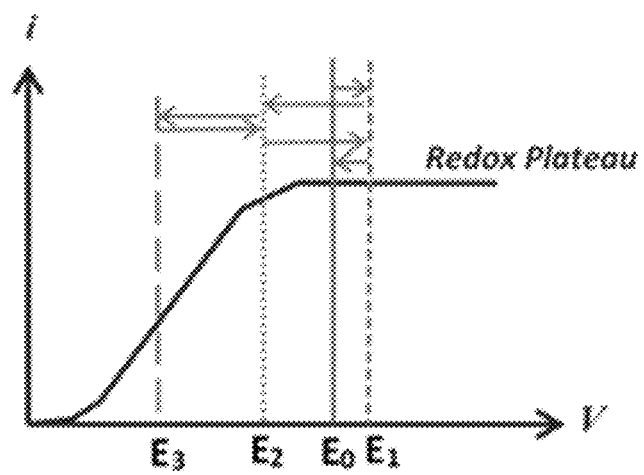
FIG. 3D illustrates a graph of an I-V curve and the individual potential steps for a PPM sequence implemented according to one or more embodiments of the disclosure.
Figure 3E:
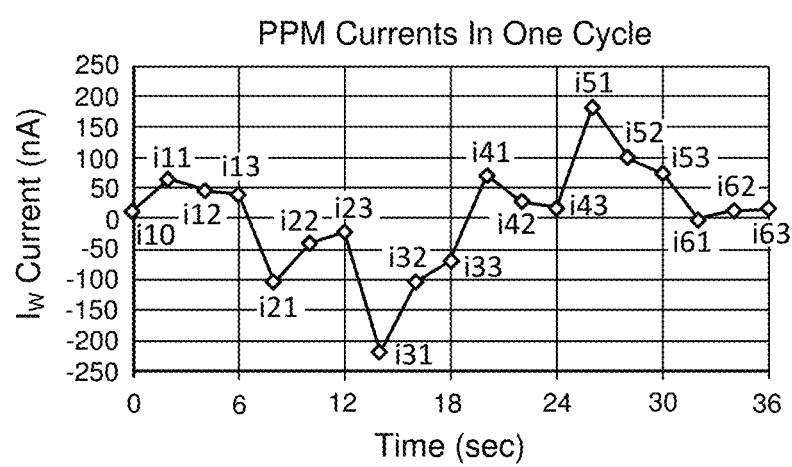
FIG. 3E illustrates a graph of typical output currents from the PPM sequence shown in FIG. 3B and the labelling of currents in each potential step according to one or more embodiments of the disclosure.

If the applied potential is reversed to a lower voltage, or specifically from $E_1$ to $E_2$ and further to $E_3$ in FIG. 3D (steps 2 and 3 in FIG. 3B), two things will happen: (1) the measurable species is no longer fully oxidized at the electrode surface because of the lower potential, (2) there is a partial reduction of the measurable species, or the oxidized form of the mediator, with the generation of negative currents. The combined effect of these two events accumulates an excess measureable species at and near the electrode surface. Thus the concentration profile is disrupted from the otherwise straight line condition reaching zero at the electrode surface. This condition is referred to as the non-steady-state, which is shown in FIG. 3C, where $C_{med}$ is not at zero at the electrode surface. The output currents of such effect are shown as negative and labelled i21, i22, i23 and i31, i32, i33 in FIG. 3E for steps 2 and 3 of FIG. 3B. The negative currents suggest a partial reduction at the potential steps from high to low. The disruption of the steady-state condition only occurs near the electrode surface if the potential modulation process is short while the boundary environment inside and outside the membrane ($C_{membrane}$ and $C_{outer}$) remains unchanged.

Alternation of NSS and SS conditions: When the potential is reversed again in step 4 from $E_3$ to $E_2$ as shown in FIGS. 3B and 3D, part of the accumulated measurable species is consumed where oxidation is at a higher rate set by the higher potential $E_2$. Even though $E_2$ is not at the plateau region of the redox species, this step provides a sudden consumption of the measurable species and produces a jump in current output from the non-steady-state concentration, and thus provides a strong indication of the concentration. Step 5 in FIG. 3B from $E_2$ to $E_1$ further completes the non-steady-state oxidation of the excess species to position the sensor at an operation potential on the plateau region again. Step 6 of FIG. 3B takes a negative plateau-degenerate step to return to the original potential which leads to resuming the steady-state condition before the next potential modulation cycle. Such condition is in theory the same as that in FIG. 3A. Thus, when the PPM cycle is repeated, the conditions of steady-state and non-steady-state are alternating and providing signals for analyte concentration determinations.

Extracted ratio parameters: As examples, further consideration of parameters R1 (=i13/i11), R4 (=i43/i41) and y45 (=i43/i51) provides the following insights: Parameter R1 is extracted from the PPM currents in potential step 1 (FIG. 3B), which is referred to as the plateau-degenerate, because the currents are from the quasi-plateau region. Parameter R4 is extracted from the PPM currents in potential step 4 (FIG. 3B), which is under the non-steady-state condition. According to the process described in FIGS. 3A to 3C, this potential step provides a clean and sharp oxidation of the excess measurable species accumulated during the short time where the electrode is at $E_3$ potential (FIG. 3D), a partial oxidation condition for the measurable species. Thus, this parameter is both an NSS and a ratio parameter. Parameters R1 (=i13/i11) and R4 (=i43/i41) are each extracted from currents of the same potential step (step 1 for R1 and step 4 for R4). Finally, the last of the examples, parameter y45 (=i43/i51) is defined according to the Yij format (last step current/first step current, described below), and is also extracted from the non-steady-state currents. This parameter represents the current ratio from currents across two potential steps.

Figure 4A:
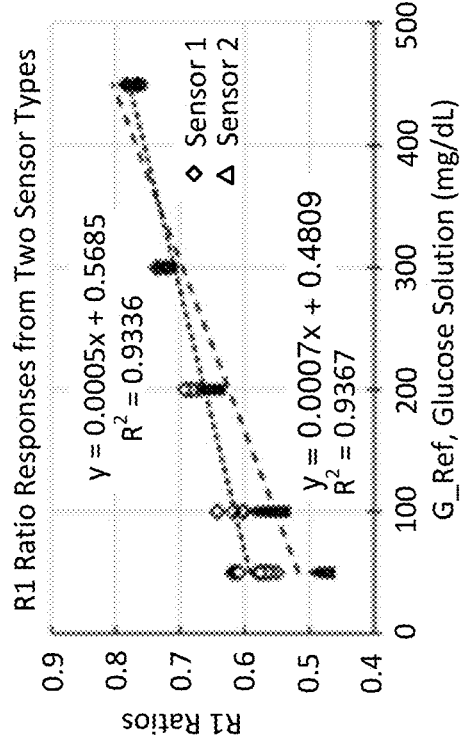
FIG. 4A illustrates a graph of a comparison of the i10 responses to glucose from sensor type 1 and type 2 according to one or more embodiments of the disclosure.
Figure 4B:
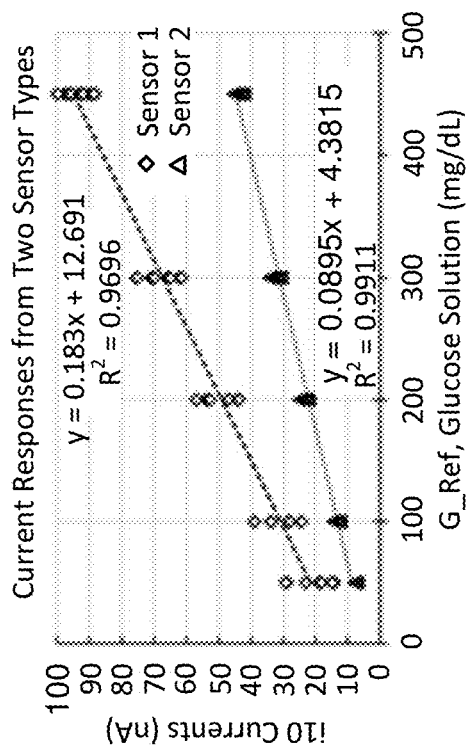
FIG. 4B illustrates a graph of a comparison of the R1 responses to glucose from sensor type 1 and type 2 according to one or more embodiments of the disclosure.
Figure 4C:
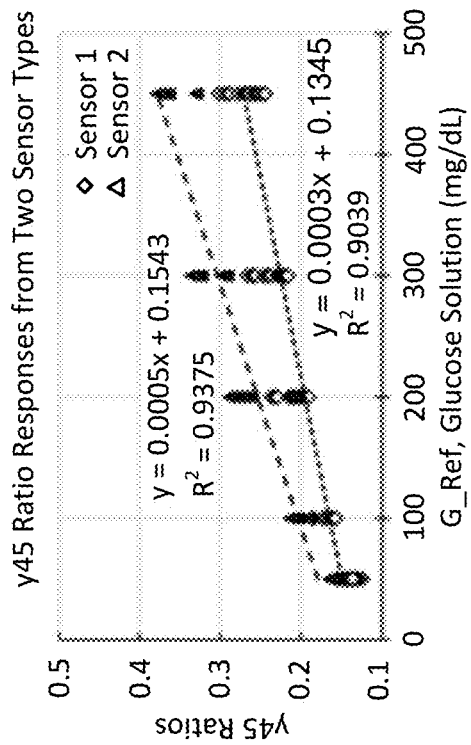
FIG. 4C illustrates a graph of a comparison of the R4 responses to glucose from sensor type 1 and type 2 according to one or more embodiments of the disclosure.
Figure 4D:
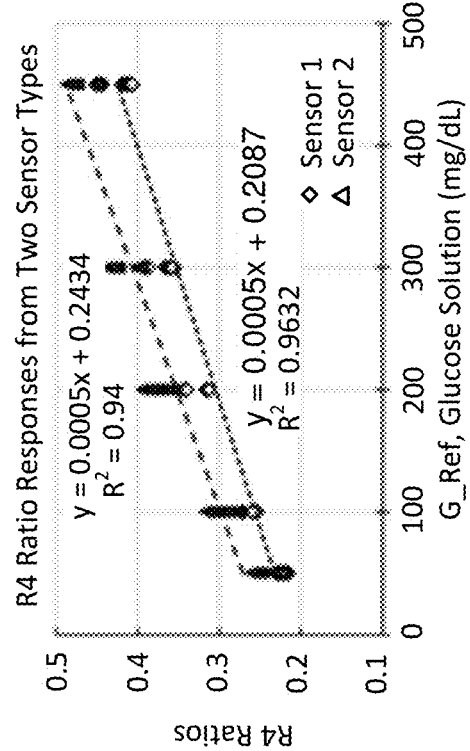
FIG. 4D illustrates a graph of a comparison of the y45 responses to glucose from sensor type 1 and type 2 according to one or more embodiments of the disclosure.

Independent electrode size of sensors: When R1, R4 and y45 are used to indicate analyte concentrations, they provide the advantage of being independent of electrode size. FIG. 4A shows a comparison of the steady-state i10 currents from two sensor types with the electrode area of sensor 1 twice that of sensor 2. The response currents of sensor 1 have twice the sensitivity of that of sensor 2 in the linearity tests of glucose solutions of 50, 100, 200, 300, and 450 mg/dL. This is to be expected. On the other hand, if the current ratios such as R1, R4, and y45 are used as the indicating parameters, the responses by the different ratio parameters are practically independent of the electrode size. The small differences may only be due to the different makes/lots of the sensors. These comparison plots are shown in FIGS. 4B, 4C, and 4D for R1, R4, and y45, respectively. The correlations of these ratio parameters with analyte concentrations are better represented with a non-linear relationship, such as a $2^{nd}$ order polynomial.

Figure 5A:
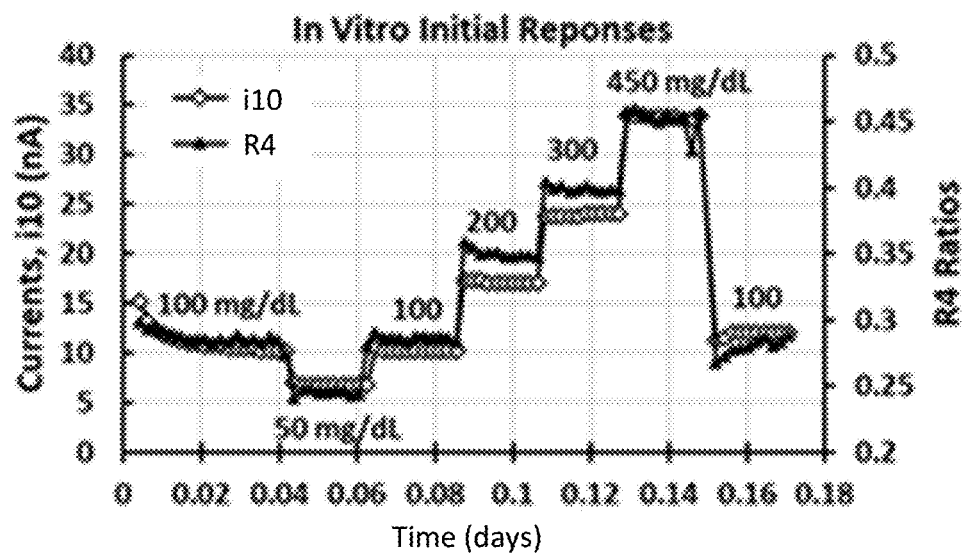
FIG. 5A illustrates a graph of a comparison of the initial responses of i10 and R4 ratio from a single sensor according to one or more embodiments of the disclosure.
Figure 5B:
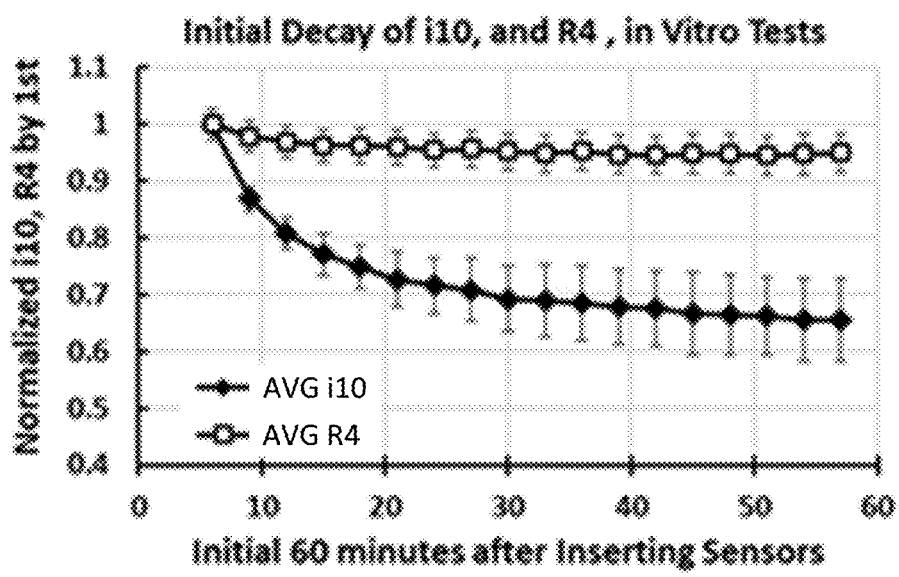
FIG. 5B illustrates a graph of a comparison of the averaged initial normalized responses of i10 and R4 from seven sensors according to one or more embodiments of the disclosure.

Short initial warmup times: Another advantage of using the ratio parameters for indicating the analyte concentration is the behavior of virtually no initial decay for the sensor during the continuous monitoring operation. FIG. 5A directly compares currents i10 of the primary data points with the R4 ratios from the same sensor in the very first linearity test of a long-term study. Not only is correspondence of the distinct R4 values to the glucose level a surprise, the initial small decay of R4 is an even bigger surprise. This advantage is better appreciated by comparing the normalized initial responses from the steady-state currents, such as the primary data point i10, and the ratio parameter R4 extracted from the non-steady-state currents. FIG. 5B compares the averages of the normalized i10 and R4 values for initial responses from seven sensors. It can be seen that while it takes about 60 minutes for the i10 current to settle in with a drop of 35% from the first reading after the initial submersion into a solution (50 and 100 mg/dL), the R4 ratio on average drops off by only 5% from its first reading. This means that the sensor warm-up time could be very fast through use of R4, on the order of 10-15 minutes, without even having to rely on a correction method/algorithm (as described below).

Independent of background signals: Another advantage of using the ratio parameters for analyte concentration determination is that they are relatively free of a background effect from different oxidizable species. One drawback of the steady-state operation condition of continuous monitoring is that other chemical species capable of passing through the membrane and of being oxidized at the electrode surface also contribute to the overall current at each current sampling time. These oxidizable species are not the target analyte and thus are interference species contributing to the overall signal. Thus, one major concern of continuous analyte sensing is the background effect in the output currents of the sensors. This can be seen in FIG. 6A where one CGM sensor is operated with the PPM method and another CGM sensor is operated at a constant applied voltage (NPPM or np). The CGM sensors were tested with glucose solutions having four different levels of acetaminophen representing the background signals: 0.2 mg/dL, 0.6 mg/dL, 1.2 mg/dL, and 1.8 mg/dL. The acetaminophen concentration of 0.2 mg/dL is considered to be equivalent to the normal level of an interfering background signal, while 0.6 mg/dL is considered to be a high level. The 1.2 and 1.8 mg/dL acetaminophen concentrations are considered to be extremely high levels. One linearity run at five levels of glucose concentration, 50, 100, 200, 300, and 450 mg/dL, was carried out for each level of background acetaminophen.

Figure 6A:
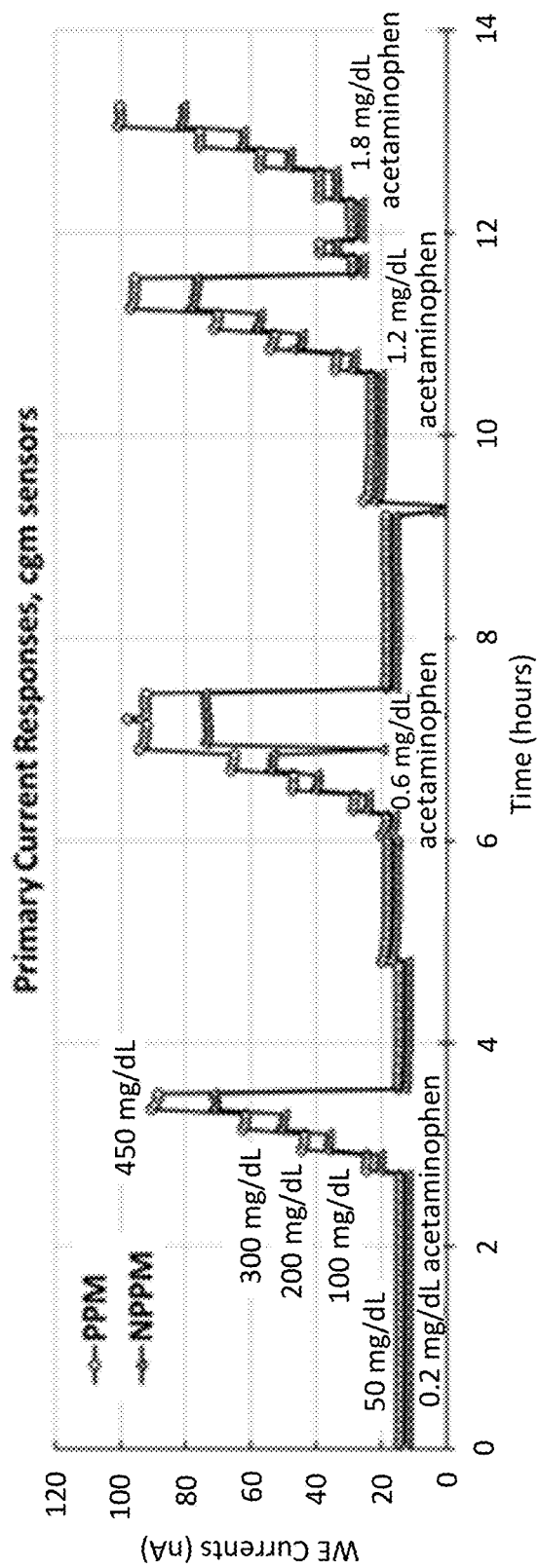
FIG. 6A illustrates a graph of temporal current profiles of the primary data points in linearity tests with four levels of acetaminophen using the PPM method and no PPM (NPPM) method according to one or more embodiments of the disclosure.
Figure 6C:
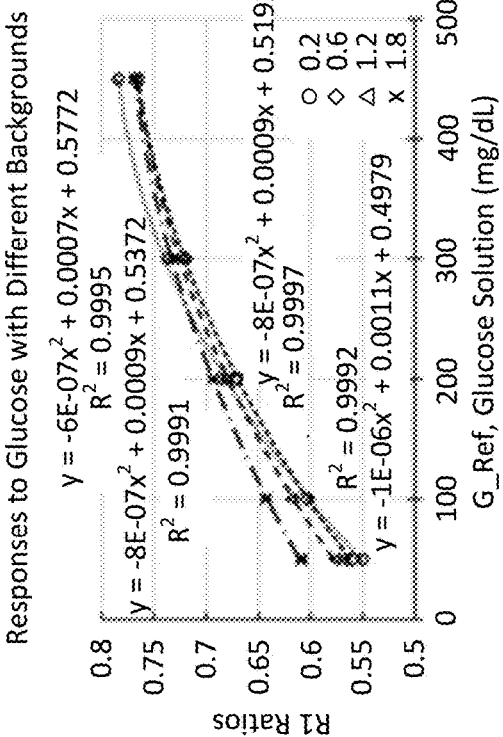
FIG. 6C illustrates a graph of PPM current responses to glucose in the same tests according to one or more embodiments of the disclosure.
Figure 6E:
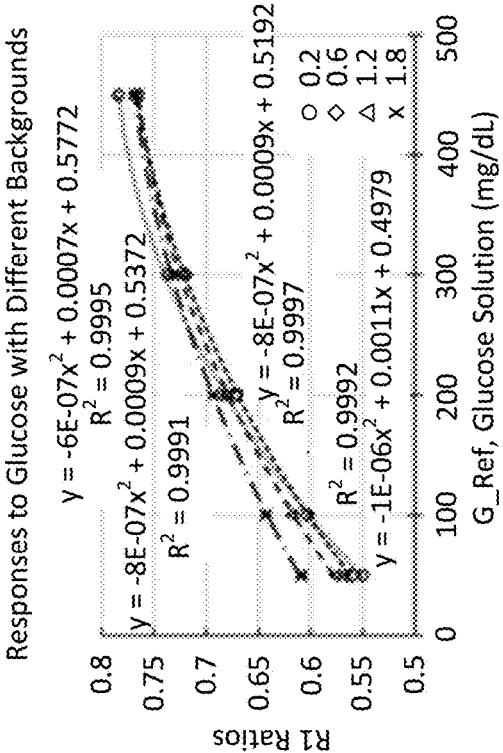
FIG. 6E illustrates a graph of R1 responses to glucose in the same tests according to one or more embodiments of the disclosure.
Figure 6B:
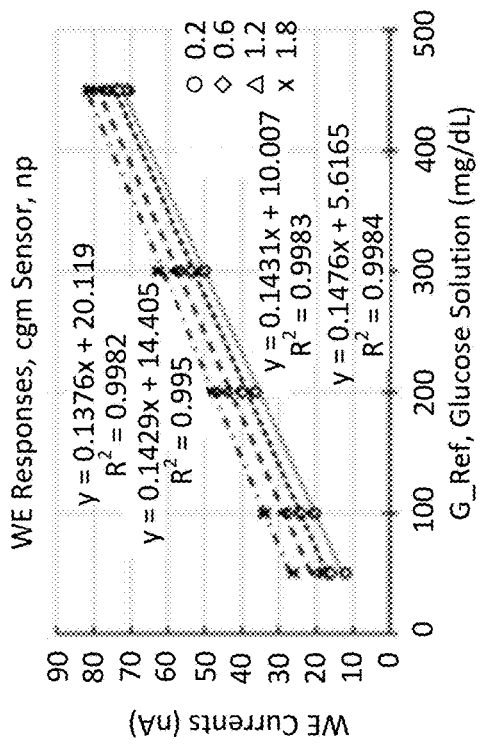
FIG. 6B illustrates a graph of current i10 responses to glucose in linearity tests with four levels of acetaminophen using the NPPM method according to one or more embodiments of the disclosure.

The responses of the primary data points from the NPPM method (no PPM cycles used) and PPM method (PPM cycles used) are shown in FIGS. 6B and 6C, respectively. The differences in response slopes are due to two different sensors operated in the NPPM and PPM modes. The effects of different background levels of acetaminophen are virtually the same as indicated by the intercepts for the NPPM and PPM methods, where the intercept is increased by about 75%, 150%, and 250% when the interference level of acetaminophen increases to 0.6, 1.2, and 1.8 mg/dL from 0.2 mg/dL. While the primary data points from the NPPM sensor operation, under the steady-state condition, show the dependence of the intercept on the level of the added acetaminophen, this result shows that the primary data points from the PPM method are also from the steady-state condition, the same as the NPPM method.

Figure 6D:
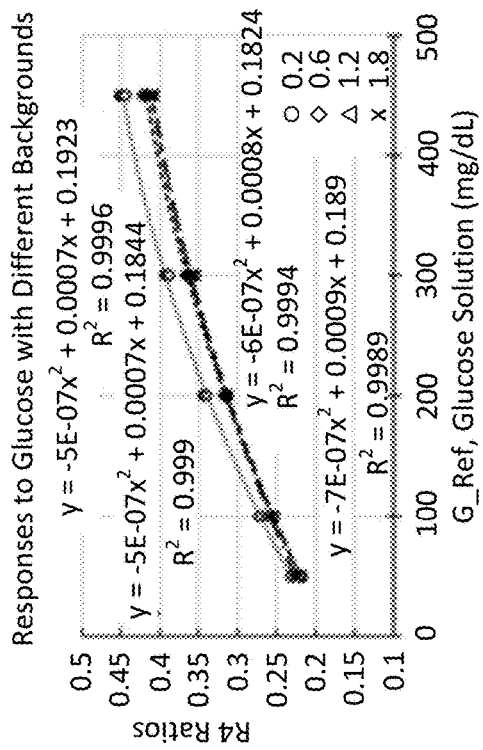
FIG. 6D illustrates a graph of R4 responses to glucose in the same tests according to one or more embodiments of the disclosure.

On the other hand, when a ratio parameter, such as R4, is used to indicate the glucose concentration, the responses are relatively independent of the different levels of the background acetaminophen, as shown in FIGS. 6D and 6E. With the responses being relatively independent of the background signals, ratio parameters as the indicating signals for analyte concentration allow more regression resources (parameter terms) to be devoted toward further increasing the accuracy of analyte concentration determination.

Figure 7A:
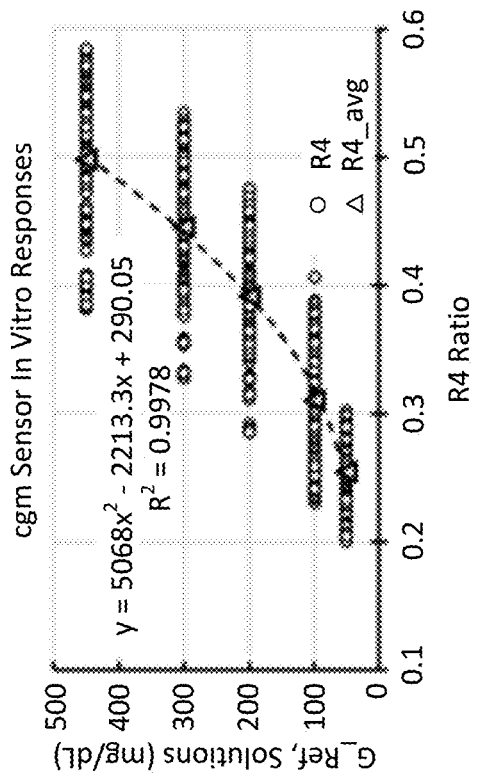
FIGS. 7A-7D illustrate graphs of CGM sensor responses and their reference correlations from a group of seven sensors in linearity tests; in particular.
Figure 7B:
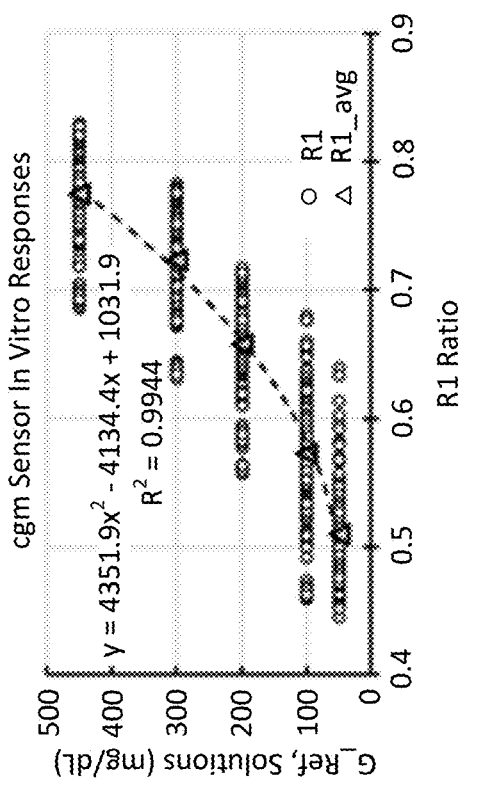
Figure 7C:
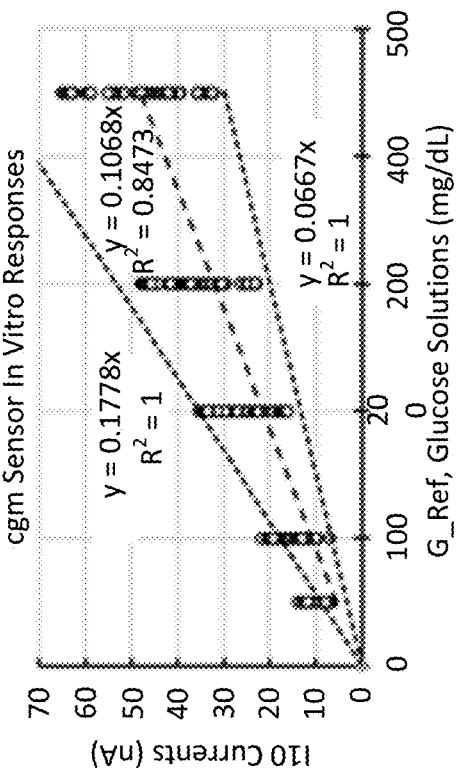
Figure 7D:
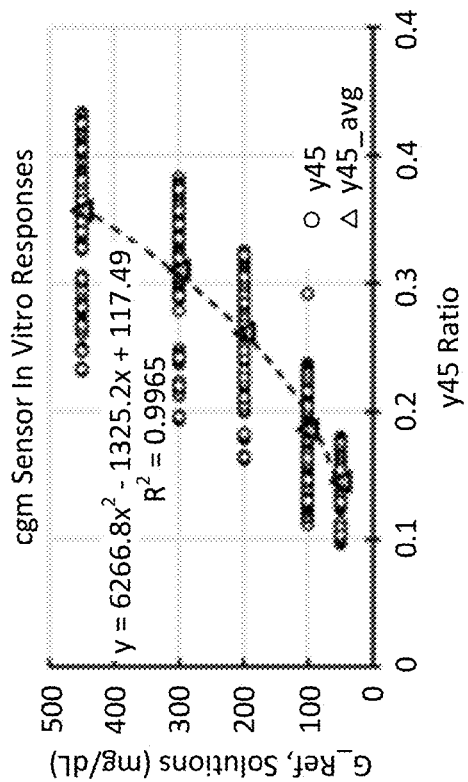

Response curves and broad scope connection: FIGS. 7A-C illustrate three plots, respectively, of $G_{Ref}$ against the prospective ratio parameters, along with the raw i10 signals from the primary data point under the steady-state condition where the same data set is from a group of 7 sensors. The $G_{Ref}$s are the gravimetric glucose concentrations, which were determined using a YSI glucose analyzer (from YSI Incorporated of Yellow Springs, Ohio) to be within ±2% of face values. The $2^{nd}$ order polynomial equation in each of the ratio plots serves as the reference correlation for each of these three ratio parameters from the regression of the average values of ratios at each glucose concentration. The independent and dependent variables of these three plots are reversed so that the ratio parameters can be directly input to the polynomial equations to obtain the glucose concentrations, instead of trying to solve a quadratic equation to obtain the glucose concentrations. The ratio responses are approximately 3× in range from low to high, the same as that shown in FIG. 7D for the linear response plot of the i10 currents.

The ratio parameters as the analyte indicating parameters can also provide a broad scope connection from the in-vitro to in-vivo glucose in a wide range of responses, in the same manner as the i10 currents. That is, a single conversion function may be used to convert the ratio R4 values to $G_{raw}$ values, followed by reducing the error $\Delta G/G_{raw}$ through a connection function as described further below. Other methods of utilizing the R4 ratio (or other PPM ratio parameters) for determining analyte concentration may also be employed. The results of compensation by a connection function for each parameter are summarized in Table 800 shown in FIG. 8. The results show that the ratio parameters are capable of converging the wide spread sensor responses to a narrow band of glucose values by a connection function.

Use of Conversion and Connection Functions

Given the uncertainty of making a one-to-one correlation between in vitro and in vivo sensitivities, a method of making a connection from in vitro to in vivo glucose is disclosed herein by applying a unified "conversion function" to the data of a wide range of sensor responses, followed by a "connection function" to reduce glucose error to a narrow band. The unified conversion function computes raw or "initial" glucose values $G_{raw}$=f(signal), where "signal" is the measured current signal (or a parameter derived from one or more measured current signals) and "f" may be a linear or non-linear function. When the conversion function f is non-linear, then sensitivity or response slope is not applied (as described below).

In its simplest form, a unified conversion function may be a linear relationship between measured current signals and reference glucose levels obtained from in vitro test data. For example, a unified conversion function may be a linear relationship between the glucose signal (e.g., Iw–Ib, R1, R4, y45, or another PPM current signal or parameter), a slope and reference glucose $G_{ref}$:

Signal=slope*$G_{ref}$ such that, $G_{ref}$=signal/slope where slope represents a composite slope (slope$_{composite}$), also referred to as a unified composite slope. The above relationship may then be used to calculate an initial or raw glucose $G_{raw}$ during CGM:

$G_{raw}$=signal/slope$_{composite}$

As described above, PPM current signal parameters such as R1, R4, and y45 may be less sensitive to interference effects and exhibit less warmup sensitivity. For this reason, in some embodiments provided herein, the unified composite slope may be determined from PPM current signal parameters, such as R1, R4, and y45, or another suitable PPM current signal parameter. In some embodiments, rather than using a linear conversion function, a non-linear conversion function, such as a polynomial, may be employed (e.g., to better fit the varied responses of sensors). For example, FIGS. 7A, 7B and 7C illustrate polynomial fits of R1, R4, and y45 to reference glucose $G_{ref}$. These polynomial fits may serve as connection functions for determining an initial or raw glucose value from R1, R4, or y45:

For R1: $G_{raw}$=4351.9*(R1)$^2$−4134.4*(R1)+1031.9

For R4: $G_{raw}$=5068*(R4)$^2$−2213.3*(R4)+290.05

For y45: $G_{raw}$=6266.8*(y45)$^2$−1325.2*(y45)+117.49

Other relationships may be used. Note that the equivalent form of Iw–Ib for the primary data (i10) could be used. However, since the R1, R4, and y45 are relatively indifferent to interference effects from other interference species, no background subtraction is used. In some embodiments, multiple conversion functions may be used.

A single conversion makes the in vitro to in vivo connection a simple matter without calibrations, if a connection function is applied to the individual error (% bias=100%*$\Delta G/G$=100%*($G_{raw}$−$G_{ref}$)/$G_{ref}$) to obtain the narrow band of glucose. This connection function is derived from the PPM parameters based on the $\Delta G/G_{raw}$ values. By way of such narrowing of the error band from the initial or raw glucose $G_{raw}$, the connection function is referred to as making connection from in vitro to in vivo without calibrations, meaning accommodating all responses of sensors to a narrow band of error.

A connection function is said to be a broad scope connection from the in vitro glucose to the in vivo glucose when the connection function provides the predicted in vivo glucose values to a narrow band of error without calibration. In this context, it is not seeking to establish the one-to-one corresponding relationship for the in vitro sensitivity and in vivo sensitivity. Instead, the connection function will provide glucose values from sensors within a sensitivity range as long as the sensors are responsive to glucose. The responses may be linear or non-linear.

Taking advantage of the rich information about CGM sensors from the PPM currents, this function is derived from the PPM currents and the associated parameters. When each response data point at the periodic cycle is converted by a composite conversion function to a glucose value $G_{raw}$, there is an error or %-bias associated with it $\Delta G/G_{raw} = (G_{raw}-G_{ref})/G_{ref}$. By setting $G_{connect}=G_{ref}$, then $G_{connect}=G_{raw}/(1+\Delta G/G_{raw})=G_{raw}/(1+\text{connection function})$ where connection function=$\Delta G/G_{raw}$=f(PPM parameters). One way for deriving the connection function is by setting the relative error $\Delta G/G_{raw}$ as the target of the multi-variate regression and the input parameters from the PPM parameters.

To summarize, in some embodiments, the R1, R4, or y45 PPM parameters may be used as part of a conversion function to convert raw current signal information to a raw or initial glucose value $G_{raw}$. Once $G_{raw}$ is known, a connection function may then be employed to compute a compensated or final glucose signal or concentration, $G_{comp}$. For example, the connection function may be derived from in vitro data using SS signals (i10) and NSS signals (PPM signals) as input parameters and relative error $\Delta G/G_{raw}$ as the target for multi-variate regression. An example connection function CF is provided below. It will be understood that other numbers and/or types of terms may be used.
CF=30.02672+3.593884*ni23−11.74152*R3−0.915224*z54+0.026557*GR41−0.061011*GR43+0.17876*Gy43+0.355556*R62R54−1.910667*R54R42−0.367626*R54R43−0.010501*GR43R31−4.92585*z61z63−48.9909*z63z32−22.97277*z64z42−2.566353*z64z43+69.93413*z65z52−75.5636*z65z32−16.28583*z52z32 . . . +0.017588*Gy51y42+0.020281*Gy51y32−1.92665*R62z51−0.348193*R62z53−0.901927*R62z31+75.69296*R64z52−222.675*R65z52−29.05662*R65z53−142.145*R65z32+15.47396*R51z53+74.8836*R51z32+23.1061*R42z32+0.0018396*GR52z41+0.100615*GR31z32−8.89841*R61y52+1.873765*R61y42+2.459974*R61y43 . . . +4.911592*z41y31−1.04261*z31y32−0.014889*Gz61y42+0.007133*Gz63y65+0.019989*Gz64y51+0.004536*Gz64y43−0.01605*Gz65y54+0.00011*Gz52y32+0.004775*Gz53y54−0.531827*d32−0.026387*Gd11−0.010296*Gd21+0.003426*Gd32−6.350168*d21d31+8.39652*d22d31−0.0329025*Gd11d31−0.039527*av1−2.342127*av1i10+0.550159*av3i10−4.87669*av14−0.139865*av16+14.59835*av25−9.31e−5*Gav3−0.000143*Gav4+0.001157*Gav16−0.022394*Gav25−0.000888*Gav26−0.928135*R30+2.307865*R50−4.501269*z60−7.491846*w65w51−3.56458*w65w53+7.147535*w43w32 . . . .

The input parameters for connection function CF may be the following types, for example.

Probing currents: The probing potential modulation currents i11, i12, i13, . . . , i61, i62, i63, wherein the first digit (x) of the ixy format denotes the potential step while the second digit (y) denotes which current measurement made after application of the potential step (e.g., the first, second, or third measurement).

R parameters: These ratios are computed by the ending PPM current being divided by the first PPM current within one potential step. For example, R1=i13/i11, R2=i23/i21, R3=i33/i31, R4=i43/i41, R5=i53/i51, and R6=i63/i61.

X-type parameters: The general format for this type of parameter is given by the ending PPM current of a later potential step being divided by the ending PPM current of an earlier potential step. For example, parameter x61 is determined by i63/i13 where i63 is the ending PPM current of step 6 in the three recorded currents per step while i13 is the ending PPM current of step 1. Additionally, x61=i63/i13, x62=i63/i23, x63=i63/i33, x64=i63/i43, x65=i63/i53, x51=i53/i13, x52=i53/i23, x53=i53/i33, x54=i53/i43, x41=i43/i13, x42=i43/i23, x43=i43/i33, x31=i33/i13, x32=i33/i23, and x21=i23/i13.

Y-type parameters: The general format for this type of parameter is given by the ending PPM current of a later potential step being divided by the first PPM current of an earlier potential step. For example, parameter y61 is determined by i63/i11 where i63 is the ending PPM current of step 6 in the three recorded currents per step while i11 is the first ppm current of step 1. Additionally, y61=i63/i11, y62=i63/i21, y63=i63/i31, y64=i63/i41, y65=i63/i51, y51=i53/i11, y52=i53/i21, y53=i53/i31, y54=i53/i41, y41=i43/i11, y42=i43/i21, y43=i43/i31, y31=i33/i11, y32=i33/i21, and y21=i23/i11.

Z-type parameters: The general format for this type of parameter is given by the first PPM current of a later potential step being divided by the ending PPM current of an earlier potential step. For example, parameter z61 is determined by i61/i13 where i61 is the first PPM current of step 6 in the three recorded currents per step while i13 is the ending PPM current of step 1. Additionally, z61=i61/i13, z62=i61/i23, z63=i61/i33, z64=i61/i43, z65=i61/i53, z51=i51/i13, z52=i51/i23, z53=i51/i33, z54=i51/i43, z41=i41/i13, z42=i41/i23, z43=i41/i33, z31=i31/i13, z32=i31/i23, and z21=i21/i13.

Additional terms include normalized currents: ni11=i11/i10, ni12=i12/i10 . . . , relative differences: d11=(i11−i12)/i10, d12=(i12−i13)/i10 . . . , average currents of each PPM potential step av1=(i11+i12+i13)/3, av2=(i21, +i22, +i23)/3, . . . , and average current ratios av12=av1/av2, av23=av2/av3 . . . . Other miscellaneous terms include GR1=$G_{raw}$*R1, Gz61=$G_{raw}$*z61, Gy52=$G_{raw}$*y52 . . . , R63R51=R63/R51, R64R43=R64/R43 . . . , z64z42=z64/z42, z65z43=z65/z43 . . . , d11d31=d11/d31, d12d32=d12/d32 . . . , Gz61y52=G*z61/y52 . . . , etc.

Other types of parameters, such as the PPM current differences or relative differences carrying the equivalent or similar information, or the ratios of middle PPM currents, may also be used.

Thus, the extracted parameters R1, R4, and y45 can be used to indicate the raw glucose analyte concentration, and a connection function may be used with the raw glucose analyte concentration to connect in vitro to in vivo glucose. The results of compensation by the conversion function to $G_{raw}$ and the connection function to $G_{comp}$ are summarized in FIG. 8. The results show that R1, R4, and y45 may be used as the analyte indicating signal and are capable of converging the wide spread responses to a narrow band of glucose values by a connection function.

In some embodiments, the PPM cycle or sequence is designed to take no more than half of the time of the primary data cycle (e.g., 3-5 minutes) to allow sufficient time for the constant voltage applied to working electrode for the steady-state condition to resume before the next primary data point is recorded. In some embodiments, the PPM cycle may be on the order of about 1 to 90 seconds, or no more than 50% in a regular 180-second primary data cycle.

In one or more embodiments, the PPM cycle may be about 10-40 seconds and/or include more than one modulation potential step around the mediator's redox plateau. In some embodiments, the PPM sequence may be on the order of 10-20% of the regular primary data point cycle. For instant, when the regular primary data point cycle is 180 seconds (3 minutes), a PPM cycle of 36 seconds is 20% of the primary data point cycle. The remaining time of the primary data cycle allows the steady-state condition to resume at the constant applied voltage. For the potential steps in the PPM cycle, the durations are of a transient nature such that the boundary conditions of the measurable species created by these potential steps are non-steady-state. Thus, each potential step may be on the order of 1-15 seconds in some embodiments, about 3-10 seconds in other embodiments, and about 4-6 seconds in yet other embodiments.

In some embodiments, the probing potential modulation (PPM) may step into the potential region of the non-diffusion-limited redox condition, or the kinetics region of the mediator (meaning the output currents are dependent on the applied voltage with the higher applied voltage producing higher output currents from the electrode). For instance, E2 and E3 of FIG. 3D (steps 2 and 3 of FIG. 3B) are two potential steps in the kinetics region of the mediator generating the non-steady-state output currents from the electrode. On reversal of the potential steps, the same magnitudes of applied voltages E2 and E1 are resumed to probe the output currents of non-steady-state from the electrode.

Different embodiments of attending non-steady-state conditions may be employed. For instance, the non-steady-state conditions may also be probed by one step directly to the target potential E2 and returning to the starting potential E1, which is followed by a second probing potential step going directly to a different potential E3 in the kinetics region with a different non-steady-state condition, and then directly returning to the starting potential E1. The intent is to modulate the applied potentials to create the alternation of steady-state and non-steady-state conditions for the measurable species at the electrode surface whereby signals from the non-steady-state may be used for determining the analyte concentrations.

Example CGM Systems

Figure 9A:
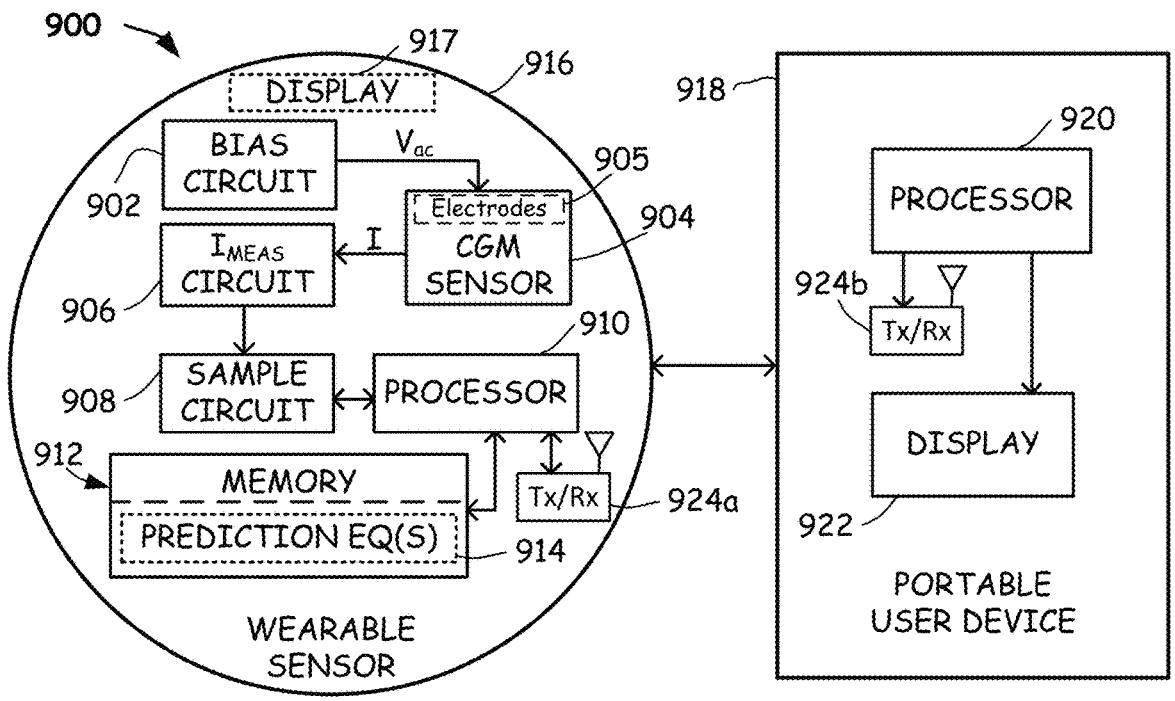
FIG. 9A illustrates a high-level block diagram of an example CGM device according to one or more embodiments of the disclosure.

FIG. 9A illustrates a high-level block diagram of an example CGM device 900 in accordance with embodiments provided herein. Although not shown in FIG. 9A, it is to be understood that the various electronic components and/or circuits are configured to couple to a power supply, such as but not limited to a battery. CGM device 900 includes a bias circuit 902 that may be configured to couple to a CGM sensor 904. Bias circuit 902 may be configured to apply a bias voltage, such as a continuous DC bias, to an analyte-containing fluid through CGM sensor 904. In this example embodiment, the analyte-containing fluid may be human interstitial fluid, and the bias voltage may be applied to one or more electrodes 905 of CGM sensor 904 (e.g., a working electrode, a background electrode, etc.).

Bias circuit 902 also may be configured to apply a PPM sequence, as shown in FIG. 3B or another PPM sequence, to CGM sensor 904. For example, PPM sequences may be applied initially and/or at intermediate time periods, or applied for each primary data point. PPM sequences may be applied before, after, or before and after measurement of a primary data point, for example.

In some embodiments, the CGM sensor 904 may include two electrodes and the bias voltage and probing potential modulations (PPMs) may be applied across the pair of electrodes. In such cases, current may be measured through the CGM sensor 904. In other embodiments, the CGM sensor 904 may include three electrodes such as a working electrode, a counter electrode, and a reference electrode. In such cases, the bias voltage and probing potential modulations may be applied between the working electrode and the reference electrode, and current may be measured through the working electrode, for example. The CGM sensor 904 includes chemicals which react with a glucose-containing solution in a reduction-oxidation reaction, which affects the concentration of charge carriers and the time-dependent impedance of the CGM sensor 904. Example chemicals include glucose oxidase, glucose dehydrogenase, or the like. In some embodiments, a mediator such as ferricyanide or ferrocene may be employed.

The continuous bias voltage generated and/or applied by bias circuit 902 may range from about 0.1 to 1 volts versus the reference electrode, for example. Other bias voltages may be used. Example PPM values are described previously.

PPM currents and non-PPM (NPPM) currents through CGM sensor 904 in an analyte-containing fluid responsive to PPMs and a constant bias voltage may be conveyed from CGM sensor 904 to a current measurement ($I_{meas}$) circuit 906 (also referred to as current sensing circuitry). Current measurement circuit 906 may be configured to sense and/or record current measurement signals that have magnitudes indicative of the magnitudes of the currents conveyed from CGM sensor 904 (e.g., using a suitable current-to-voltage converter (CVC), for example). In some embodiments, current measurement circuit 906 may include a resistor having a known nominal value and a known nominal precision (e.g., 0.1% to 5%, or even smaller than 0.1%, in some embodiments), through which the current conveyed from CGM sensor 904 is passed. A voltage developed across the resistor of current measurement circuit 906 represents the magnitude of the current and may be referred to as the current measurement signal.

In some embodiments, a sample circuit 908 may be coupled to current measurement circuit 906 and may be configured to sample the current measurement signal. Sample circuit 908 may then produce digitized time-domain sample data that is representative of the current measurement signal (e.g., digitized glucose signals). For example, sample circuit 908 may be any suitable A/D converter circuit configured to receive the current measurement signal, which is an analog signal, and convert it to a digital signal having a desired number of bits as an output. The number of bits output by sample circuit 908 may be sixteen in some embodiments, but more or fewer bits may be used in other embodiments. In some embodiments, sample circuit 908 may sample the current measurement signal at a sampling rate in the range of about 10 samples per second to 1000 samples per second. Faster or slower sampling rates may be used. For example, sampling rates such as about 10 kHz to 100 kHz may be used and down-sampled to further reduce signal-to-noise ratio. Any suitable sampling circuitry may be employed.

Still referring to FIG. 9A, a processor 910 may be coupled to sample circuit 908 and to a memory 912. In some embodiments, processor 910 and sample circuit 908 are configured to directly communicate with each other via a wired pathway (e.g., via a serial or parallel connection). In other embodiments, the coupling of processor 910 and sample circuit 908 may be by way of memory 912. In this arrangement, sample circuit 908 writes digital data to memory 912, and processor 910 reads the digital data from memory 912.

Memory 912 may have stored therein one or more prediction equations 914 for use in determining glucose values based on primary data points (NPPM currents) and PPM currents (from current measurement circuit 906 and/or sample circuit 908). In some embodiments, these prediction equations may include one or more conversion functions and/or connection functions as described above. For example, in some embodiments, two or more prediction equations may be stored in memory 912, each for use with different segments (time periods) of CGM collected data. In some embodiments, memory 912 may include a prediction equation based on primary current signals generated by application of a constant voltage potential applied to a reference sensor, and a plurality of PPM current signals generated by application of a PPM sequence applied between primary current signal measurements.

Memory 912 also may have stored therein a plurality of instructions. In various embodiments, processor 910 may be a computational resource such as but not limited to a microprocessor, a microcontroller, an embedded microcontroller, a digital signal processor (DSP), a field programmable gate array (FPGA) configured to perform as a microcontroller, or the like.

In some embodiments, the plurality of instructions stored in memory 912 may include instructions that, when executed by the processor 910, cause the processor 910 to (a) cause the CGM device 900 (via bias circuit 902, CGM sensor 904, current measurement circuit 906 and/or sample circuit 908) to measure current signals (e.g., primary current signals and PPM current signals) from interstitial fluid; (b) store current signals in memory 912; (c) compute prediction equation parameters such as ratios (and/or other relationships) of currents from different pulses, voltage steps or other voltage changes within a PPM sequence; (d) employ computed prediction equation parameters to compute glucose values (e.g., concentrations) using prediction equations; and/or (e) communicate glucose values to a user.

Memory 912 may be any suitable type of memory, such as but not limited to, one or more of a volatile memory and/or a non-volatile memory. Volatile memory may include, but is not limited to, a static random access memory (SRAM) or a dynamic random access memory (DRAM). Non-volatile memory may include, but is not limited to, an electrically programmable read-only memory (EPROM), an electrically erasable programmable read-only memory (EEPROM), a flash memory (e.g., a type of EEPROM in either of the NOR or NAND configurations, and/or in either the stacked or planar arrangements, and/or in either the single-level cell (SLC), multi-level cell (MLC), or combination SLC/MLC arrangements), a resistive memory, a filamentary memory, a metal oxide memory, a phase change memory (such as a chalcogenide memory), or a magnetic memory. Memory 912 may be packaged as a single chip or as multiple chips, for example. In some embodiments, memory 912 may be embedded, with one or more other circuits, in an integrated circuit, such as, for example, an application specific integrated circuit (ASIC).

As noted above, memory 912 may have a plurality of instructions stored therein that, when executed by processor 910, cause processor 910 to perform various actions specified by one or more of the stored plurality of instructions. Memory 912 may further have portions reserved for one or more "scratchpad" storage regions that may be used for read or write operations by processor 910 responsive to execution of one or more instructions of the plurality of instructions.

In the embodiment of FIG. 9A, bias circuit 902, CGM sensor 904, current measurement circuit 906, sample circuit 908, processor 910, and memory 912 including prediction equation(s) 914, may be disposed within a wearable sensor portion 916 of CGM device 900. In some embodiments, wearable sensor portion 916 may include a display 917 for displaying information such as glucose concentration information (e.g., without use of external equipment). Display 917 may be any suitable type of human-perceivable display, such as but not limited to, a liquid crystal display (LCD), a light-emitting diode (LED) display, or an organic light emitting diode (OLED) display.

Still referring to FIG. 9A, CGM device 900 may further include a portable user device portion 918. A processor 920 and a display 922 may be disposed within portable user device portion 918. Display 922 may be coupled to processor 920. Processor 920 may control the text or images shown by display 922. Wearable sensor portion 916, and portable user device portion 918, may be communicatively coupled. In some embodiments, the communicative coupling of wearable sensor portion 916 and portable user device portion 918 may be by way of wireless communication via transmitter circuitry and/or receiver circuitry, such as transmit/receive circuit TxRx 924a in wearable sensor portion 916 and transmit/receive circuit TxRx 924b in portable user device 918, for example. Such wireless communication may be by any suitable means including but not limited to standards-based communications protocols such as the Bluetooth® communications protocol. In various embodiments, wireless communication between wearable sensor portion 916 and portable user device portion 918 may alternatively be by way of near-field communication (NFC), radio frequency (RF) communication, infra-red (IR) communication, or optical communication. In some embodiments, wearable sensor portion 916 and portable user device portion 918 may be connected by one or more wires.

Display 922 may be any suitable type of human-perceivable display, such as but not limited to, a liquid crystal display (LCD), a light-emitting diode (LED) display, or an organic light emitting diode (OLED) display.

Figure 9B:
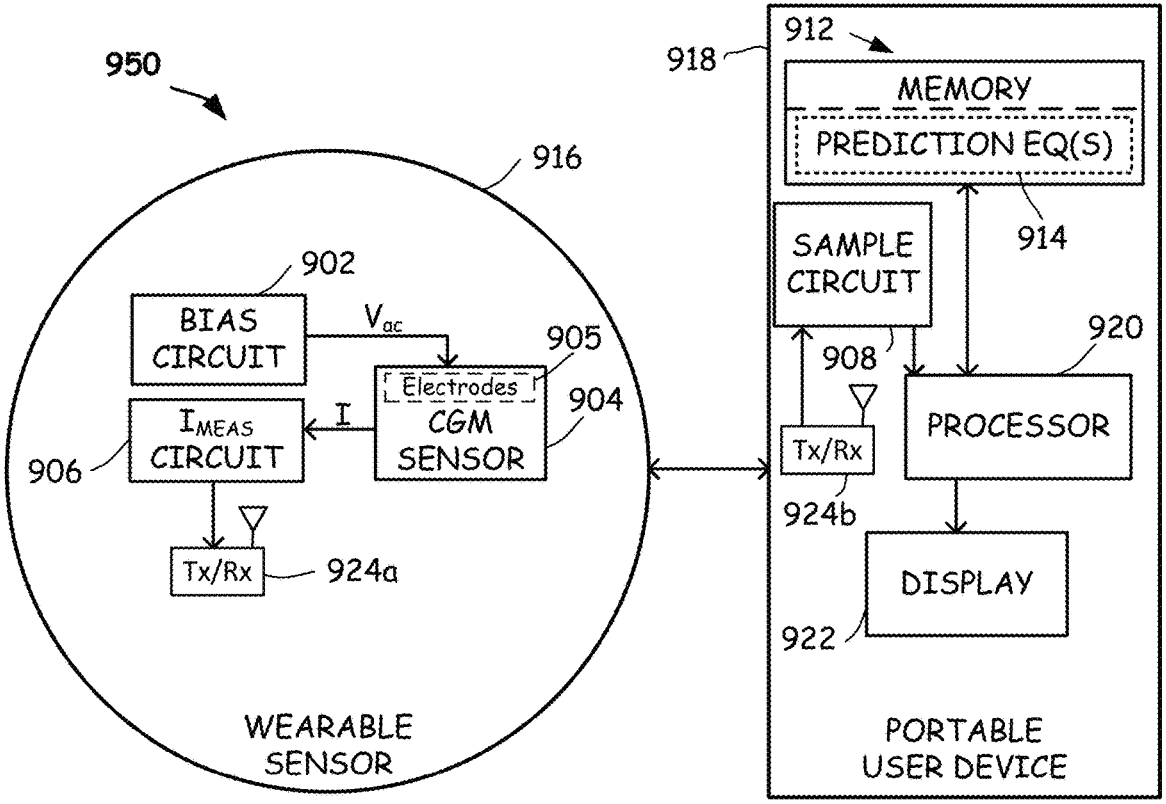
FIG. 9B illustrates a high-level block diagram of another example CGM device according to one or more embodiments of the disclosure.

Referring now to FIG. 9B, an example CGM device 950 is shown that is similar to the embodiment illustrated in FIG. 9A, but having a different partitioning of components. In CGM device 950, the wearable sensor portion 916 includes the bias circuit 902 coupled to the CGM sensor 904, and the current measurement circuit 906 coupled to the CGM sensor 904. The portable user device portion 918 of CGM device 950 includes the sample circuit 908 coupled to processor 920, and the display 922 coupled to processor 920. Processor 920 is further coupled to memory 912 that may include prediction equation(s) 914 stored therein. In some embodiments, processor 920 in CGM device 950 may also perform the previously-described functions performed by processor 910 of CGM device 900 of FIG. 9A, for example. Wearable sensor portion 916 of CGM device 950 may be smaller and lighter, and therefore less invasive, than CGM device 900 of FIG. 9A because sample circuit 908, processor 910, memory 912, etc., are not included therein. Other component configurations may be employed. For example, as a variation to the CGM device 950 of FIG. 9B, sample circuit 908 may remain on wearable sensor portion 916 (such that portable user device 918 receives digitized glucose signals from wearable sensor portion 916).

Figure 10:
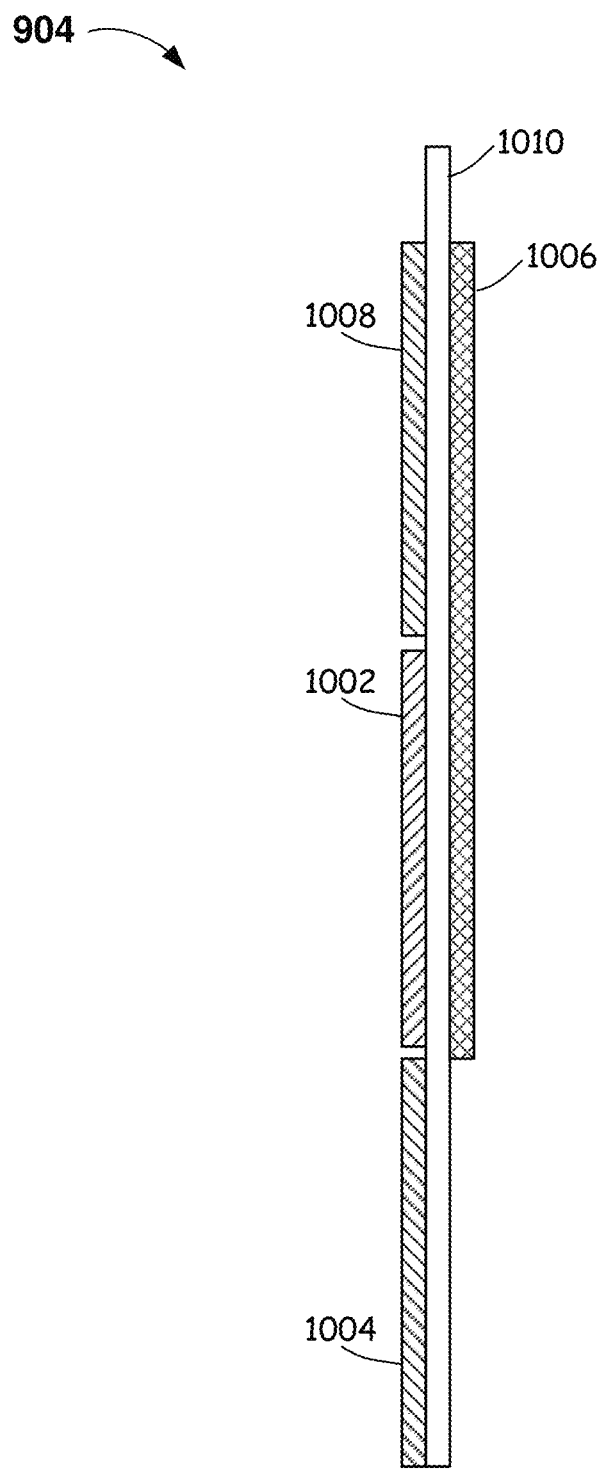
FIG. 10 is a side schematic view of an example glucose sensor according to one or more embodiments of the disclosure.

FIG. 10 is a side schematic view of an example glucose sensor 904 in accordance with embodiments provided herein. In some embodiments, glucose sensor 904 may include a working electrode 1002, a reference electrode 1004, a counter electrode 1006 and a background electrode 1008. The working electrode may include a conductive layer coated with a chemical which reacts with a glucose-containing solution in a reduction-oxidation reaction (which affects the concentration of charge carriers and the time-dependent impedance of the CGM sensor 904). In some embodiments, the working electrode may be formed from platinum or surface roughened platinum. Other working electrode materials may be used. Example chemical catalysts (e.g., enzymes) for the working electrode 1002 include glucose oxidase, glucose dehydrogenase, or the like. The enzyme component may be immobilized onto the electrode surface by a cross-linking agent such as glutaraldehyde, for example. An outer membrane layer may be applied onto the enzyme layer to protect the overall inner components including the electrode and the enzyme layer. In some embodiments, a mediator such as ferricyanide or ferrocene may be employed. Other chemical catalysts and/or mediators may be employed.

In some embodiments, reference electrode 1004 may be formed from Ag/AgCl. The counter electrode 1006 and/or the background electrode 1008 may be formed by a suitable conductor such as platinum, gold, palladium, or the like. Other materials may be used for the reference, counter, and/or background electrodes. In some embodiments, the background electrode 1008 may be identical to the working electrode 1002, but without the chemical catalyst and mediator. Counter electrode 1006 may be isolated from the other electrodes by an isolation layer 1010 (e.g., polyimide or another suitable material).

Figure 11:
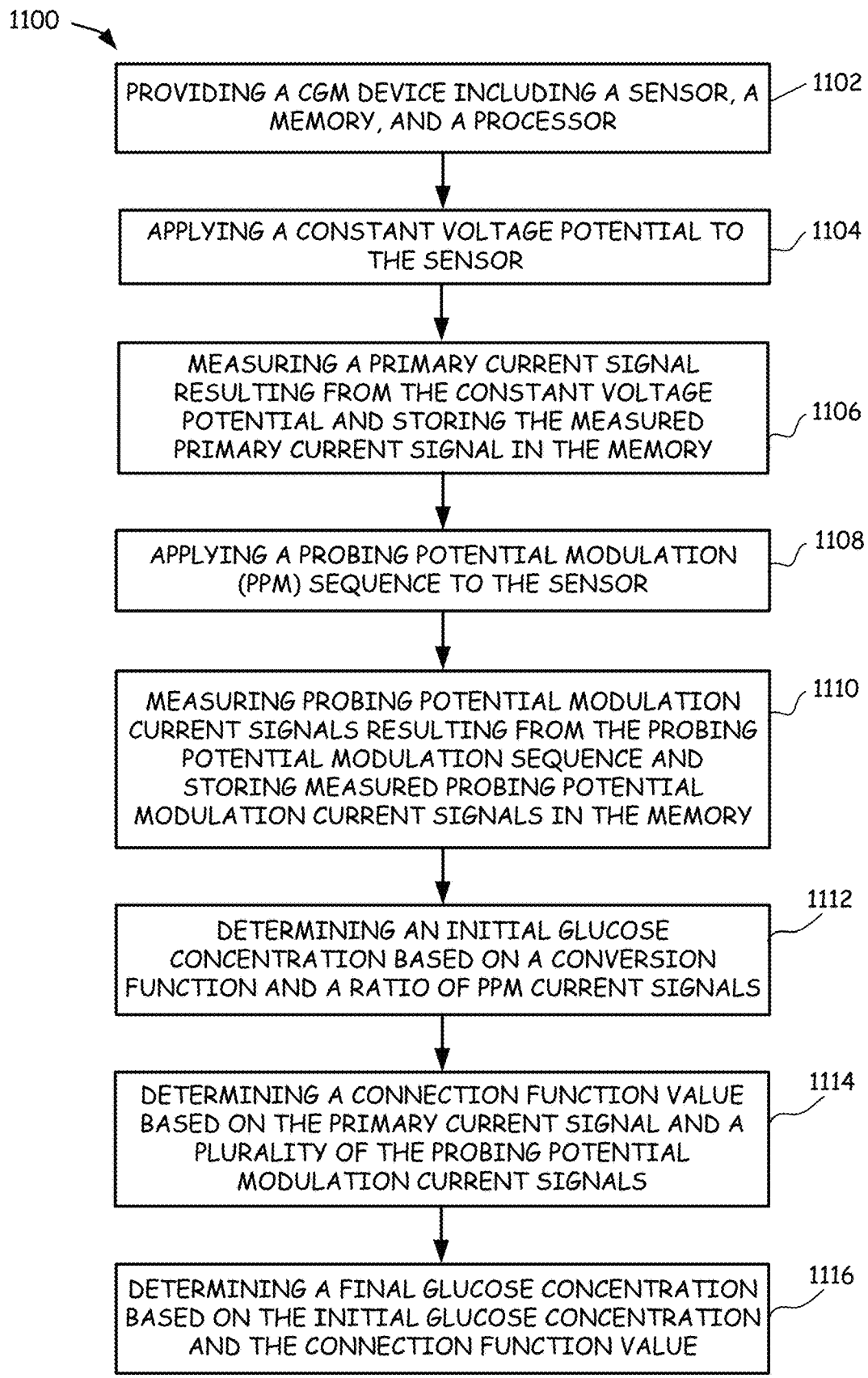
FIG. 11 illustrates an example method of determining glucose values during continuous glucose monitoring measurements, in accordance with embodiments provided herein.

FIG. 11 illustrates an example method 1100 of determining glucose values during continuous glucose monitoring measurements in accordance with embodiments provided herein. Method 1100 includes, in Block 1102, providing a CGM device including a sensor, a memory, and a processor (e.g., CGM device 900 or 950 of FIGS. 9A and 9B). Method 1100 also includes, in Block 1104, applying a constant voltage potential to the sensor (e.g., $E_0$ in FIG. 1A). In Block 1106, method 1100 includes measuring a primary current signal resulting from the constant voltage potential and storing the measured primary current signal in the memory. In Block 1108, method 1100 includes applying a probing potential modulation sequence to the sensor (e.g., the PPM sequence of FIG. 3B). In Block 1110, method 1100 includes measuring probing potential modulation current signals resulting from the probing potential modulation sequence and storing measured probing potential modulation current signals in the memory. Method 1100 further includes: in Block 1112, determining an initial glucose concentration based on a conversion function and a ratio of the measured probing potential modulation current signals; in Block 1114, determining a connection function value based on the primary current signal and a plurality of the probing potential modulation current signals; and in Block 1116, determining a final glucose concentration based on the initial glucose concentration and the connection function value. The final glucose concentration may be communicated to a user (e.g., via display 917 or 922 of FIG. 9A or 9B).

Note that some embodiments, or portions thereof, may be provided as a computer program product or software that may include a machine-readable medium having non-transient instructions stored thereon, which may be used to program a computer system, controller, or other electronic device to perform a process in accordance with one or more embodiments.

While the disclosure is susceptible to various modifications and alternative forms, specific method and apparatus embodiments have been shown by way of example in the drawings and are described in detail herein. It should be understood, however, that the particular methods and apparatus disclosed herein are not intended to limit the disclosure or the claims.

What is claimed is:

1. A method of determining glucose values during continuous glucose monitoring (CGM) measurements comprising:
providing a wearable CGM device comprising a sensor implanted subcutaneously into a user to produce current signals from interstitial fluid, the wearable CGM device further comprising:
a processor;
a transmitter circuitry coupled to the processor;
a working electrode for converting an analyte into a measurable species;
the sensor coupled to the processor;
a display;
a bias circuit periodically establishing a non-steady state condition by applying a sequence of probing potential modulation (PPM) voltage signals to the working electrode; and
a memory coupled to the processor;
performing a primary data cycle comprising:
establishing a steady-state condition by applying, via the bias circuit, a constant voltage potential continuously to the sensor;
wherein applying the constant voltage potential fully oxidizes the measurable species;
periodically measuring a primary current signal generated by the constant voltage potential, and
storing the primary current signal in the memory;
performing a probing potential modulation (PPM) cycle after each primary current signal measurement, comprising:
periodically establishing a non-steady-state condition by perturbing, via the bias circuit, the constant voltage potential with the sequence of PPM voltage signals that differ from the constant voltage potential,
wherein the sequence of PPM voltage signals comprises:
a first voltage potential greater than the constant voltage potential at a first time;
a second voltage potential less than the constant voltage potential at a second time after the first time;
a third voltage potential less than the second voltage potential at a third time after the second time; and
a fourth voltage potential greater than the third voltage potential at a fourth time after the third time;
wherein applying the second voltage potential of the sequence of PPM voltage signals decreases oxidation of the measurable species;
measuring a plurality of PPM current signals for each PPM voltage signal generated by the sequence of PPM voltage signals, and
storing the plurality of PPM current signals in the memory, wherein the PPM cycle is no more than half of the primary data cycle;
calculating a plurality of ratio parameters from the plurality of PPM current signals,
wherein the plurality of ratio parameters comprises a first ratio of a last current signal measured during the fourth voltage potential to a first current signal measured during the fourth voltage potential;
calculating an initial glucose concentration by applying at least one of the plurality of ratio parameters to a conversion function;

determining a connection function value based on the primary current signal and the plurality of ratio parameters;

calculating a final glucose concentration based on the initial glucose concentration and the connection function value; and displaying the final glucose concentration to the user.

2. The method of claim 1, wherein the initial glucose concentration is calculated based on the conversion function and a ratio of measured PPM current signals measured during the first voltage potential.

3. The method of claim 1, wherein the initial glucose concentration is calculated based on the conversion function and a ratio of measured PPM current signals measured during the fourth voltage potential.

4. The method of claim 1, wherein the sequence of PPM voltage signals further comprises a fifth voltage potential greater than the fourth voltage potential at a fifth time after the fourth time.

5. The method of claim 4, wherein the initial glucose concentration is calculated based on the conversion function and a ratio of PPM current signals measured during the fourth voltage potential and the fifth voltage potential.

6. The method of claim 1, wherein the primary current signal and the plurality of PPM current signals are working electrode current signals.

7. The method of claim 1, wherein primary current signals are measured every 3 and 15 minutes.

8. The method of claim 1, wherein the plurality of ratio parameters is independent of electrode size.

9. A wearable continuous glucose monitoring (CGM) device comprising:
a working electrode for converting an analyte into a measurable species;
a sensor configured to be implanted subcutaneously into a user to produce current signals from interstitial fluid;
a display;
a bias circuit periodically establishing a non-steady state condition by applying a sequence of probing potential modulation (PPM) voltage signals to the working electrode;
a processor;
a transmitter circuitry coupled to the processor; and
a memory coupled to the processor;
wherein the memory includes a connection function and computer program code stored therein that, when executed by the processor, causes the CGM device to:
establish a steady-state condition by continuously applying, via the bias circuit, a constant voltage potential to the sensor;
wherein applying the constant voltage potential fully oxidizes the measurable species;
periodically measure a primary current signal generated by the constant voltage potential during a primary data cycle;
store the primary current signal in the memory;
periodically establish a non-steady-state condition by perturbing, via the bias circuit, the constant voltage potential during a PPM cycle, after the primary current signal is measured, with the sequence of PPM voltage signals that differ from the constant voltage potential,
wherein the sequence of PPM voltage signals comprises:
a first voltage potential greater than the constant voltage potential at a first time;
a second voltage potential less than the constant voltage potential at a second time after the first time;
a third voltage potential less than the second voltage potential at a third time after the second time; and
a fourth voltage potential greater than the third voltage potential at a fourth time after the third time;
wherein applying the second voltage potential of the sequence of PPM voltage signals decreases oxidation of the measurable species;
measure a plurality of PPM current signals for each PPM voltage signal generated in the sequence of PPM voltage signals;
store the plurality of PPM current signals in the memory,
wherein a first time duration of the PPM cycle is no more than half of a second time duration of the primary data cycle;
calculate a plurality of ratio parameters from the plurality of PPM current signals,
wherein the plurality of ratio parameters comprises a first ratio of a last current signal measured during the fourth voltage potential to a first current signal measured during the fourth voltage potential;
calculate an initial glucose concentration by applying at least one of the plurality of ratio parameters to a conversion function;
determine a connection function value based on the primary current signal and the plurality of ratio parameters;
calculate a final glucose concentration from the initial glucose concentration and the connection function value; and
cause the final glucose concentration to be displayed to the user.

10. The wearable CGM device of claim 9, wherein the initial glucose concentration is calculated based on the conversion function and a ratio of measured PPM current signals measured during the first voltage potential.

11. The wearable CGM device of claim 9, wherein the initial glucose concentration is calculated based on the conversion function and a ratio of measured PPM current signals measured during the fourth voltage potential.

12. The wearable CGM device of claim 9, wherein the sequence of PPM voltage signals further comprises a fifth voltage potential greater than the fourth voltage potential at a fifth time after the fourth time.

13. The wearable CGM device of claim 12, wherein the initial glucose concentration is calculated based on the conversion function and a ratio of measured PPM current signals measured during the fourth voltage potential and the fifth voltage potential.

14. The wearable CGM device of claim 9, wherein the primary current signal and PPM current signals are working electrode current signals.

15. The wearable CGM device of claim 9, wherein the primary data cycle measures the primary current signal every 3 and 15 minutes.

16. The wearable CGM device of claim 9, wherein the plurality of ratio parameters is independent of electrode size.

17. The wearable CGM device of claim 9, further comprising:
current sensing circuitry coupled to the sensor and configured to measure current signals produced by the sensor; and sampling circuitry coupled to the current sensing circuitry and configured to generate digitized current signals from the measured current signals.

18. The wearable CGM device of claim 9, wherein the transmitter circuitry is configured to communicate glucose values to a portable user device for presentation to the user of the wearable CGM device.

19. The wearable CGM device of claim 9, wherein the second voltage potential and the third voltage potential cause an accumulation of the measurable species proximate an electrode surface.

20. The wearable CGM device of claim 19, wherein the fourth voltage potential causes at least a partial consumption of the accumulation of the measurable species.

* * * * *